US012253590B2

(12) United States Patent
Yamanouchi et al.

(10) Patent No.: US 12,253,590 B2
(45) Date of Patent: Mar. 18, 2025

(54) OBJECT DETECTION APPARATUS, OBJECT DETECTION METHOD, AND COMPUTER-READABLE RECORDING MEDIUM

(71) Applicant: NEC Corporation, Tokyo (JP)

(72) Inventors: Shingo Yamanouchi, Tokyo (JP); Toshiyuki Nomura, Tokyo (JP); Taichi Tanaka, Tokyo (JP); Tatsuya Sumiya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 476 days.

(21) Appl. No.: 17/640,421

(22) PCT Filed: Sep. 10, 2019

(86) PCT No.: PCT/JP2019/035587
§ 371 (c)(1),
(2) Date: Mar. 4, 2022

(87) PCT Pub. No.: WO2021/048929
PCT Pub. Date: Mar. 18, 2021

(65) Prior Publication Data
US 2022/0413115 A1    Dec. 29, 2022

(51) Int. Cl.
*G01S 13/34* (2006.01)
*G01S 13/04* (2006.01)

(52) U.S. Cl.
CPC ............. *G01S 13/34* (2013.01); *G01S 13/04* (2013.01)

(58) Field of Classification Search
CPC ...... G01S 13/878; G01S 13/87; G01S 13/876; G01S 13/89; G01S 2103/0254; G01S 2103/0245; G01S 2103/9316
(Continued)

(56) References Cited

U.S. PATENT DOCUMENTS 5,394,151 A * 2/1995 Knaell ................. G01S 7/4021
342/25 F
5,519,605 A * 5/1996 Cawlfield ............ G05B 13/048
700/45
(Continued)

FOREIGN PATENT DOCUMENTS

JP    H03-159482 A    7/1991
JP    2005-253702 A   9/2005
(Continued)

OTHER PUBLICATIONS

English translation of Written opinion for PCT Application No. PCT/JP2019/035587, mailed on Dec. 3, 2019.
(Continued)

*Primary Examiner* — Vladimir Magloire
*Assistant Examiner* — Michael W Justice

(57) ABSTRACT

An object detection apparatus 1000 includes: a transmission unit 1101, having a transmission antenna, configured to emit a radio wave toward an object using the transmission antenna; a reception unit 1102, having a reception antenna, configured to receive the radio wave reflected by the object as a reception signal and generate an intermediate frequency signal from the reception signal received; and a processing device 1211. The processing device 1211 calculates an amplitude distribution of the radio wave reflected by the object on the basis of the placement of the transmission antenna, the placement of the reception antenna, the frequency of the radio wave emitted from the transmission antenna, and the intermediate frequency signal, and furthermore, using a correction operator calculated from a point spread function indicating characteristics of the transmission unit 1101 and the reception unit 1102, corrects the amplitude distribution calculated.

9 Claims, 19 Drawing Sheets

(58) Field of Classification Search
USPC .......................................................... 342/128
See application file for complete search history.

(56) References Cited

U.S. PATENT DOCUMENTS

| | | | | |
|---|---|---|---|---|
| 6,999,025 | B2* | 2/2006 | Poullin | G01S 7/414 |
| | | | | 342/107 |
| 7,487,068 | B2* | 2/2009 | Chang | H04B 7/0854 |
| | | | | 702/194 |
| 9,500,746 | B2* | 11/2016 | Miles | G01S 13/06 |
| 10,154,363 | B2* | 12/2018 | Ishida | G01S 7/539 |
| 10,674,261 | B2* | 6/2020 | Nakadai | H04R 3/005 |
| 11,313,960 | B2* | 4/2022 | Yamanouchi | G01S 13/42 |
| 11,619,730 | B2* | 4/2023 | Flynn | G01S 15/8959 |
| | | | | 600/438 |
| 11,906,650 | B2* | 2/2024 | Yamanouchi | G01S 13/343 |
| 2004/0257270 | A1* | 12/2004 | Poullin | G01S 13/003 |
| | | | | 342/107 |
| 2007/0282546 | A1* | 12/2007 | Chang | H01Q 3/2611 |
| | | | | 702/57 |
| 2010/0188528 | A1 | 7/2010 | Iwata et al. | |
| 2014/0167784 | A1 | 6/2014 | Ahmed | |
| 2017/0188171 | A1* | 6/2017 | Ishida | H04R 3/12 |
| 2018/0088220 | A1* | 3/2018 | Flynn | G01S 15/8997 |
| 2020/0011986 | A1* | 1/2020 | Yamanouchi | G01S 13/42 |
| 2020/0077185 | A1* | 3/2020 | Nakadai | H04R 3/005 |
| 2021/0033699 | A1* | 2/2021 | Yamanouchi | G01S 13/42 |

FOREIGN PATENT DOCUMENTS

| | | |
|---|---|---|
| JP | 2008-142146 A | 6/2008 |
| JP | 2010-177919 A | 8/2010 |
| WO | WO-2018147025 A1 * 8/2018 | ............. G01N 22/00 |

OTHER PUBLICATIONS

International Search Report for PCT Application No. PCT/JP2019/035587, mailed on Dec. 3, 2019.

JP Office Action for JP Application No. 2021-545012, mailed on Jun. 6, 2023 with English Translation.

Lu Xinfei et al., "High-resolution Radar Imaging Using 2D Deconvolution with Sparse Echo Denoising", Journal of Radars, Chinese, June of 2018, vol. 7, No. 3, pp. 285-293, DOI: 10.12000/JR17108.

Sherif Sayed Ahmed et al., "Near Field mm—Wave Imaging with Multistatic Sparse 2D—Arrays", 2009 European Radar Conference (EuRAD), 2009, pp. 180-183, ISBN:978-1-4244-4747-3.

* cited by examiner

CONVENTIONAL

CONVENTIONAL

CONVENTIONAL

CONVENTIONAL

CONVENTIONAL

OBJECT DETECTION APPARATUS, OBJECT DETECTION METHOD, AND COMPUTER-READABLE RECORDING MEDIUM

This application is a National Stage Entry of PCT/JP2019/035587 filed on Sep. 10, 2019, the contents of all of which are incorporated herein by reference, in their entirety.

TECHNICAL FIELD

The present invention relates to an object detection apparatus and an object detection method for recognizing or identifying an object to be detected by irradiating the object to be detected with radio waves and detecting radio waves reflected or diffused by the object, and further relates to a computer-readable recording medium in which is recorded a program for realizing the same.

BACKGROUND ART

Unlike light, radio waves (microwaves, millimeter waves, terahertz waves, and the like) have superior ability to penetrate objects. Accordingly, in recent years, imaging apparatuses that can image objects under clothes or in bags by utilizing the penetrating ability of radio waves, and furthermore, remote sensing apparatuses that can image the earth's surface from satellites or aircraft by penetrating clouds with radio waves, have been put into practical use.

For example, Patent Document 1 discloses an example of an imaging apparatus (an object detection apparatus) that uses radio waves. The imaging apparatus disclosed in Patent Document 1 uses an active antenna array system. The configuration of the imaging apparatus disclosed in Patent Document 1 will be described here with reference to FIG. 18. FIG. 18 is a diagram illustrating the overall configuration of a conventional array antenna-type imaging apparatus.

As illustrated in FIG. 18, the conventional array antenna-type imaging apparatus includes a transmission/reception device 201. The transmission/reception device 201 includes transmission/reception antennas $202_1, 202_2, \ldots, 202_N$. The transmission/reception device 201 emits a transmission wave (radio wave) 204 from one or more antennas $202_m$ among the transmission/reception antennas $202_1, 202_2, \ldots, 202_N$ toward an object to be detected 203.

The transmission wave 204 is reflected by the object to be detected 203, producing reflected waves $205_1, 205_2, \ldots, 205_N$. The reflected waves $205_1, 205_2, \ldots, 205_N$ that have been produced are received by the transmission/reception antennas $202_1, 202_2, \ldots, 202_N$. The transmission/reception device 201 calculates amplitudes of the radio waves being reflected from the object to be detected 203 on the basis of the received reflected waves $205_1, 205_2, \ldots, 205_N$. The imaging apparatus then images the object to be detected 203 by imaging the distribution of radio wave amplitudes calculated by the transmission/reception device 201.

LIST OF RELATED ART DOCUMENTS

Patent Document

Patent Document 1: U.S. Patent Application Publication No. 2014/0167784

SUMMARY OF INVENTION

Problems to be Solved by the Invention

However, the imaging apparatus disclosed in Patent Document 1, which employs an active antenna array system, has the following problems.

The first problem with the active array antenna system is that the position where the object to be detected 203 can be detected is limited. This problem will be described in detail. First, the reflected wave 205 produced at the object to be detected 203 has an amplitude dependence on the reflection angle thereof. In particular, when the reflection angle satisfies the specular reflection condition, i.e., when the incident angle of the transmission wave 204 to the object to be detected 203 is equal to the reflection angle of the reflected wave 205 from the object to be detected 203, the amplitude of the reflected wave 205 is maximized. On the other hand, if the reflection angle does not satisfy the specular reflection condition, the amplitude of the reflected wave 205 will be weak.

FIG. 19 is a diagram illustrating the problem in the conventional array antenna system. First, as illustrated in FIG. 19, an aperture plane 207 is formed by the transmission/reception antennas $202_1, 202_2, \ldots, 202_N$. If the object to be detected 203 is located outside the range of the aperture plane 207, in this case, a reflected wave 206 having a strong amplitude that satisfies the specular reflection condition cannot be received by the transmission/reception antennas $202_1, 202_2, \ldots, 202_N$, which makes it difficult to detect the object to be detected 203. In other words, the position of the object to be detected 203 that can be detected is limited to within the range of the aperture plane 207. It is therefore necessary to increase the aperture length of the aperture plane 207 in order to broaden the range of positions over which the object to be detected 203 can be detected.

However, increasing the aperture length of the aperture plane 207 leads to an increase in the size of the transmission/reception device 201, which reduces the ease of installation of the transmission/reception device 201. Additionally, to increase the size of the aperture plane 207, the necessary number of transmission/reception antennas $202_1, 202_2, \ldots, 202_N$, as well as the number of transceivers connected to each of the transmission/reception antennas 202, increases, which increases the cost of the transmission/reception device 201.

A second problem with the active array antenna system is that the resolution is limited in the imaging of the radio wave amplitude distribution. Specifically, first, the length resolution in the azimuth direction parallel to the aperture plane 207 is proportional to XL/D. Here, X is the wavelength of the transmission wave 204, L is the distance between the transmission/reception device 201 and the object to be detected 203, and D is the aperture length of the aperture plane 207.

The detection accuracy of the object to be detected 203 will decrease if the desired resolution is not achieved. Although it is conceivable to set a large aperture length D for the aperture plane 207 as a means for achieving the desired resolution, setting the aperture length D to a large size leads to an increase in the size and cost of the transmission/reception device 201, as described above. Although it is also conceivable to shorten the distance L between the transmission/reception device 201 and the object to be detected 203 as another means for achieving the desired resolution, in this case, the range of positions which can be detected is limited.

Thus as described thus far, a conventional imaging apparatus using radio waves, including the imaging apparatus disclosed in Patent Document 1, has a problem in that the range of positions in which the object to be detected can be detected is limited, and a problem in that the desired resolution cannot be achieved and the detection accuracy is therefore poor. Attempting to address these problems in the conventional imaging apparatus increases the cost of the apparatus and furthermore greatly increases the size of the apparatus, which limits the applications and opportunities in which the apparatus can actually be used.

An example object of the present invention is to provide an object detection apparatus, an object detection method, and a computer-readable recording medium capable of solving the above-described problems and suppressing an increase in the size and cost of the apparatus while expanding the range of positions for an object to be detected and improving the resolution.

Means for Solving the Problems

To achieve the above-described example object, an object detection apparatus according to an example aspect of the present invention is an apparatus for detecting an object using radio waves, and includes:

a transmission unit, including a transmission antenna, configured to emit a radio wave toward the object using the transmission antenna;

a reception unit, including a reception antenna, configured to receive the radio wave reflected by the object as a reception signal and generate an intermediate frequency signal from the reception signal received; and a processing device, wherein the processing device:

calculates an amplitude distribution of the radio wave reflected by the object on the basis of a placement of the transmission antenna, a placement of the reception antenna, a frequency of the radio wave emitted from the transmission antenna, and the intermediate frequency signal, and furthermore, corrects the amplitude distribution calculated, using a correction operator calculated from a point spread function indicating characteristics of the transmission unit and the reception unit.

Additionally, to achieve the above-described example object, an object detection method according to an example aspect of the present invention is a method for detecting an object using radio waves, and includes, in an object detection apparatus including a transmission unit, having a transmission antenna, configured to emit a radio wave toward the object using the transmission antenna, and a reception unit, having a reception antenna, configured to receive the radio wave reflected by the object as a reception signal and generate an intermediate frequency signal from the reception signal received:

(a) a step of calculating an amplitude distribution of the radio wave reflected by the object on the basis of a placement of the transmission antenna, a placement of the reception antenna, a frequency of the radio wave emitted from the transmission antenna, and the intermediate frequency signal; and (b) a step of correcting the amplitude distribution calculated, using a correction operator calculated from a point spread function indicating characteristics of the transmission unit and the reception unit.

Furthermore, to achieve the above-described example object, a computer-readable recording medium according to an example aspect of the present invention is a computer-readable recording medium in which is recorded a program for using a computer to detect an object using radio waves, the program including commands for causing the computer to execute, in an object detection apparatus including a transmission unit, having a transmission antenna, configured to emit a radio wave toward the object using the transmission antenna, and a reception unit, having a reception antenna, configured to receive the radio wave reflected by the object as a reception signal and generate an intermediate frequency signal from the reception signal received:

(a) a step of calculating an amplitude distribution of the radio wave reflected by the object on the basis of a placement of the transmission antenna, a placement of the reception antenna, a frequency of the radio wave emitted from the transmission antenna, and the intermediate frequency signal; and (b) a step of correcting the amplitude distribution calculated, using a correction operator calculated from a point spread function indicating characteristics of the transmission unit and the reception unit.

Advantageous Effects of the Invention

As described above, according to the present invention, an increase in the size and cost of the apparatus can be suppressed while expanding the range of positions for an object to be detected and improving the resolution.

EXAMPLE EMBODIMENT

Example Embodiment

An object detection apparatus, an object detection method, and a program according to an example embodiment of the present invention will be described hereinafter with reference to FIGS. 1 to 17. In each of the drawings described below, identical or corresponding parts are indicated by the same reference signs, and descriptions thereof will not be repeated.

Apparatus Configuration

Figure 1:
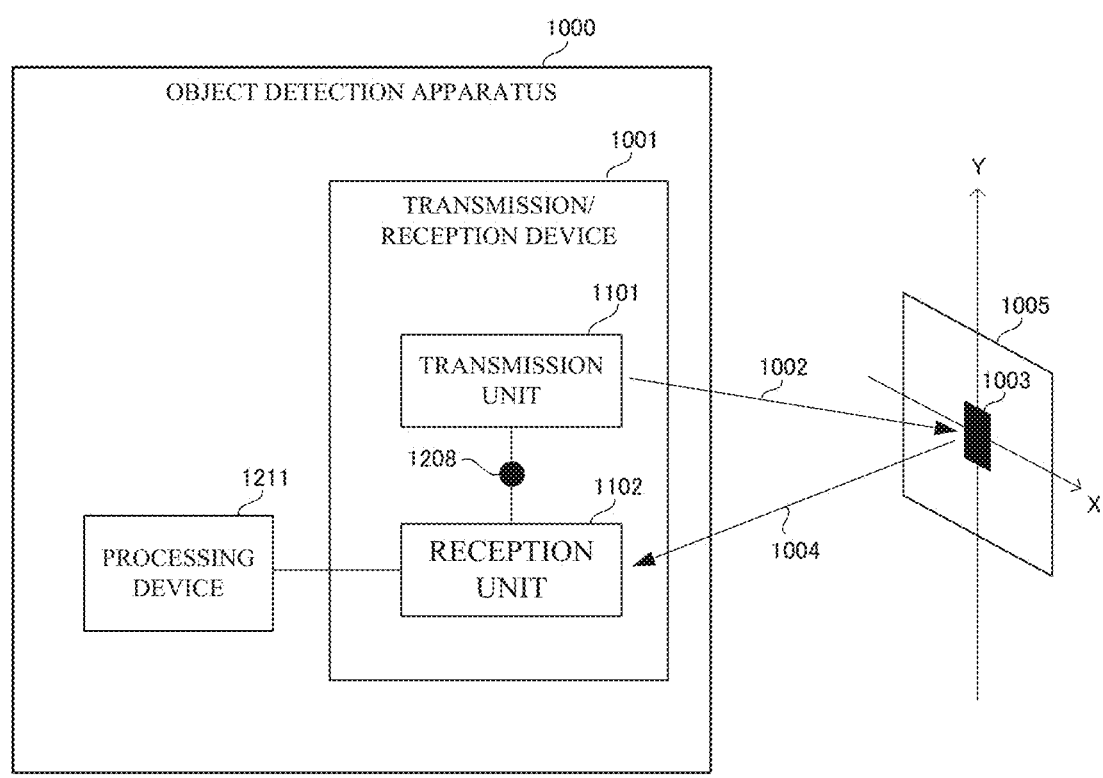
FIG. 1 is a block diagram illustrating the overall configuration of an object detection apparatus according to an example embodiment of the present invention.

First, the overall configuration of the object detection apparatus according to the present example embodiment will be described with reference to FIG. 1. FIG. 1 is a block diagram illustrating the overall configuration of the object detection apparatus according to the example embodiment of the present invention.

An object detection apparatus 1000 according to the present example embodiment illustrated in FIG. 1 is an apparatus for detecting an object to be detected (called a "target object" hereinafter) 1003 using radio waves, and is what is known as an imaging apparatus. As illustrated in FIG. 1, the object detection apparatus 1000 includes a transmission unit 1101, a reception unit 1102, and a processing device 1211. Additionally, in the example illustrated in FIG. 1, 1005 indicates a plane on which the target object 1003 is placed (called a "target object placement plane" hereinafter).

The transmission unit 1101 includes a transmission antenna, and uses the transmission antenna to emit a radio wave 1002 serving as a transmission signal toward the target object 1003 present on the target object placement plane 1005. The reception unit 1102 includes a reception antenna, and uses the reception antenna to receive a radio wave 1004 reflected by the target object 1003 as a reception signal. The reception unit 1102 further generates, from the received reception signal, an intermediate frequency signal (called an "IF signal" hereinafter).

Specifically, in the example illustrated in FIG. 1, the transmission unit 1101 outputs the transmission signal via a terminal 1208 toward the reception unit 1102. The reception unit 1102 generates an IF signal by mixing the radio wave (reception signal) 1004 that has been reflected by the target object 1003 and the transmission signal output via the terminal 1208. Additionally, the reception unit 1102 outputs the generated IF signal to the processing device 1211.

Additionally, in the example illustrated in FIG. 1, a transmission/reception device 1001 includes the transmission unit 1101 and the reception unit 1102. Furthermore, although only one each of the transmission unit 1101 and the reception unit 1102 are illustrated in the example in FIG. 1, there may actually be a plurality of transmission units 1101 and reception units 1102. If there are a plurality of transmission units 1101 and reception units 1102, each of the transmission units 1101 corresponds to one of the reception units 1102.

The processing device 1211 first calculates a distribution of the amplitudes of the radio wave reflected by the target object 1003 (called a "reflection amplitude distribution" hereinafter) on the basis of the placement of the transmission antenna, the position of the reception antenna, the frequency of the radio wave 1002 emitted from the transmission antenna, and the IF signal. Then, the processing device 1211 corrects the calculated reflection amplitude distribution using a correction operator calculated from a point spread function (PSF) indicating the characteristics of the transmission unit 1101 and the reception unit 1102.

In this manner, in the present example embodiment, by applying the correction operator to the reflection amplitude distribution of the target object 1003 obtained from measurements by transmitting and receiving radio waves, a true reflection amplitude distribution, unweighted by PSF, is calculated. Therefore, according to the present example embodiment, the range of positions over which the target object 1003 can be detected can be expanded and a higher resolution of detection can be achieved compared to typical imaging apparatuses (object detection apparatuses) using radio waves. In other words, according to the present example embodiment, the range of positions that can be detected can be expanded and the resolution can be increased, which improves the detection accuracy, while avoiding an increase in the size of the aperture, which is a cause of higher costs in the apparatus and a drop in the ease of installation.

Figure 2:
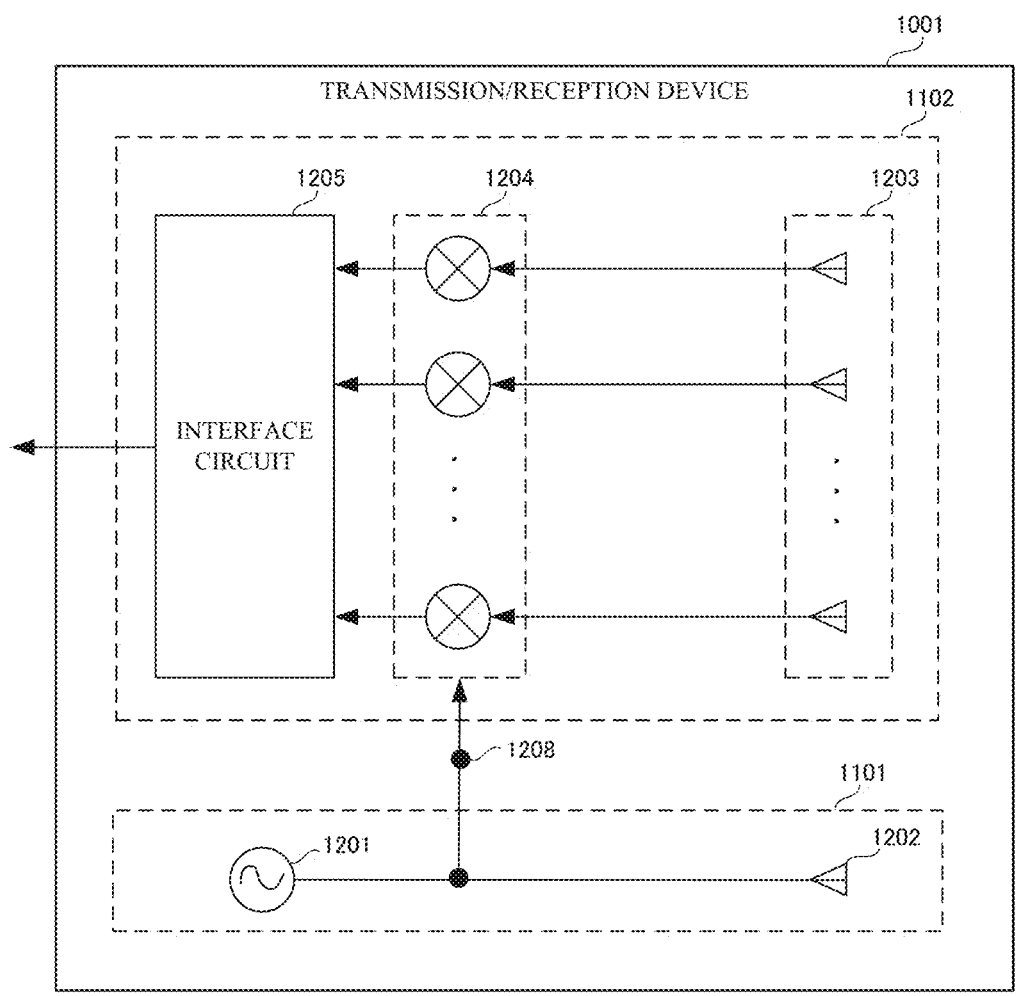
FIG. 2 is a diagram illustrating the specific configurations of a transmission unit and a reception unit in the object detection apparatus according to the example embodiment of the present invention.
Figure 3:
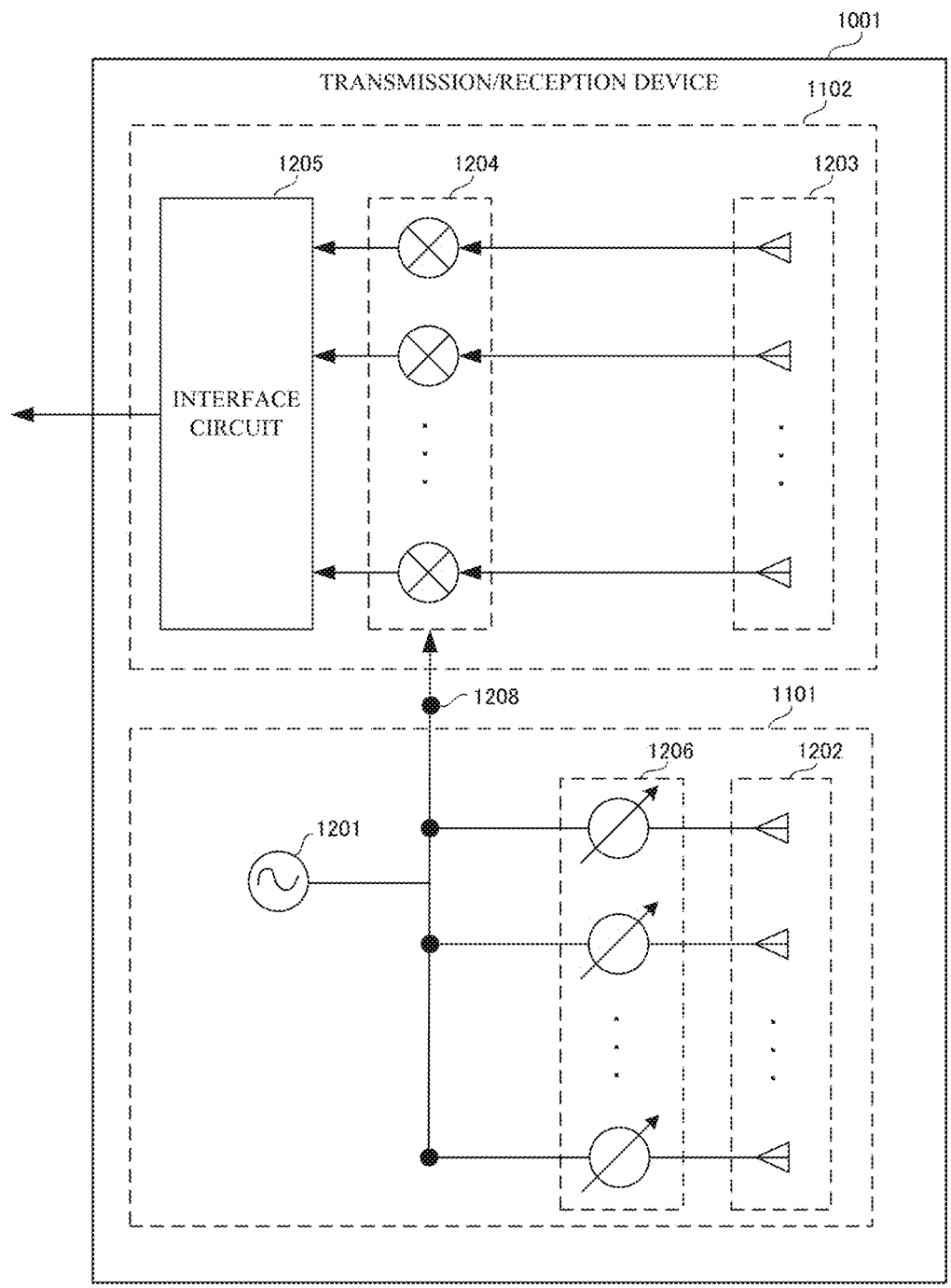
FIG. 3 is a diagram illustrating another example of the specific configurations of the transmission unit and the reception unit in the object detection apparatus according to the example embodiment of the present invention.

The configuration of the transmission/reception device 1001 of the object detection apparatus 1000 according to the present first example embodiment will be described in more detail next with reference to FIGS. 2 to 4 in addition to FIG. 1. FIG. 2 is a diagram illustrating the specific configurations of the transmission unit and the reception unit in the object detection apparatus according to the example embodiment of the present invention. FIG. 3 is a diagram illustrating another example of the specific configurations of the transmission unit and the reception unit in the object detection apparatus according to the example embodiment of the present invention.

As illustrated in FIG. 2, according to the present first example embodiment, in the transmission/reception device 1001, the transmission unit 1101 includes an oscillator 1201 and a transmission antenna 1202. The reception unit 1102 includes a reception antenna 1203, a mixer 1204, and an interface circuit 1205. Furthermore, as illustrated in FIG. 1, the transmission unit 1101 and the reception unit 1102 are connected by a terminal 1208.

In the transmission unit 1101, the oscillator 1201 generates an RF signal (radio wave). The RF signal generated by the oscillator 1201 is transmitted as a transmission signal from the transmission antenna 1202 and emitted to the target object 1003. The radio wave 1004 reflected by the target object 1003 is received by the reception antenna 1203 in the reception unit 1102.

The mixer 1204 generates an IF signal by mixing the RF signal input from the oscillator 1201 via the terminal 1208 with the radio wave received by the reception antenna 1203 (the reception signal). The IF signal generated by the mixer 1204 is transmitted to the processing device 1211 via the interface circuit 1205.

The interface circuit 1205 has a function for converting the IF signal, which is an analog signal, into a digital signal that can be handled by the processing device 1211, and then outputting the obtained digital signal to the processing device 1211.

Additionally, in the example illustrated in FIG. 2, one transmission unit 1101 includes a single transmission antenna 1202, but the present example embodiment is not limited thereto. An example in which one transmission unit 1101 includes a plurality of transmission antennas 1202 will be described with reference to FIG. 3.

In the example in FIG. 3, the transmission unit 1101 includes one oscillator 1201 and a plurality of transmission antennas 1202. The transmission unit 1101 also includes a variable phase shifter 1206 which is provided for each of the transmission antennas 1202. Each transmission antenna 1202 is connected to the oscillator 1201 via a corresponding variable phase shifter 1206. Each variable phase shifter 1206 controls the directivity of the transmission antenna 1202 by controlling the phase of the transmission signal supplied from the oscillator 1201 to each of the transmission antennas 1202.

In the example illustrated in FIG. 3, the transmission unit 1101 can also supply RF signals from the oscillator 1201 to the plurality of transmission antennas 1202 through time division. In this case, the variable phase shifter 1206 need not be provided in the transmission unit 1101.

The specific configuration of the object detection apparatus according to the present example embodiment will be described in detail next with reference to FIGS. 4 and 5, with comparison to the configuration of a conventional object detection apparatus. FIG. 4 is a block diagram illustrating the specific configuration of the object detection apparatus according to the example embodiment of the present invention. FIG. 5 is a block diagram illustrating the specific configuration of the conventional object detection apparatus.

Figure 4:
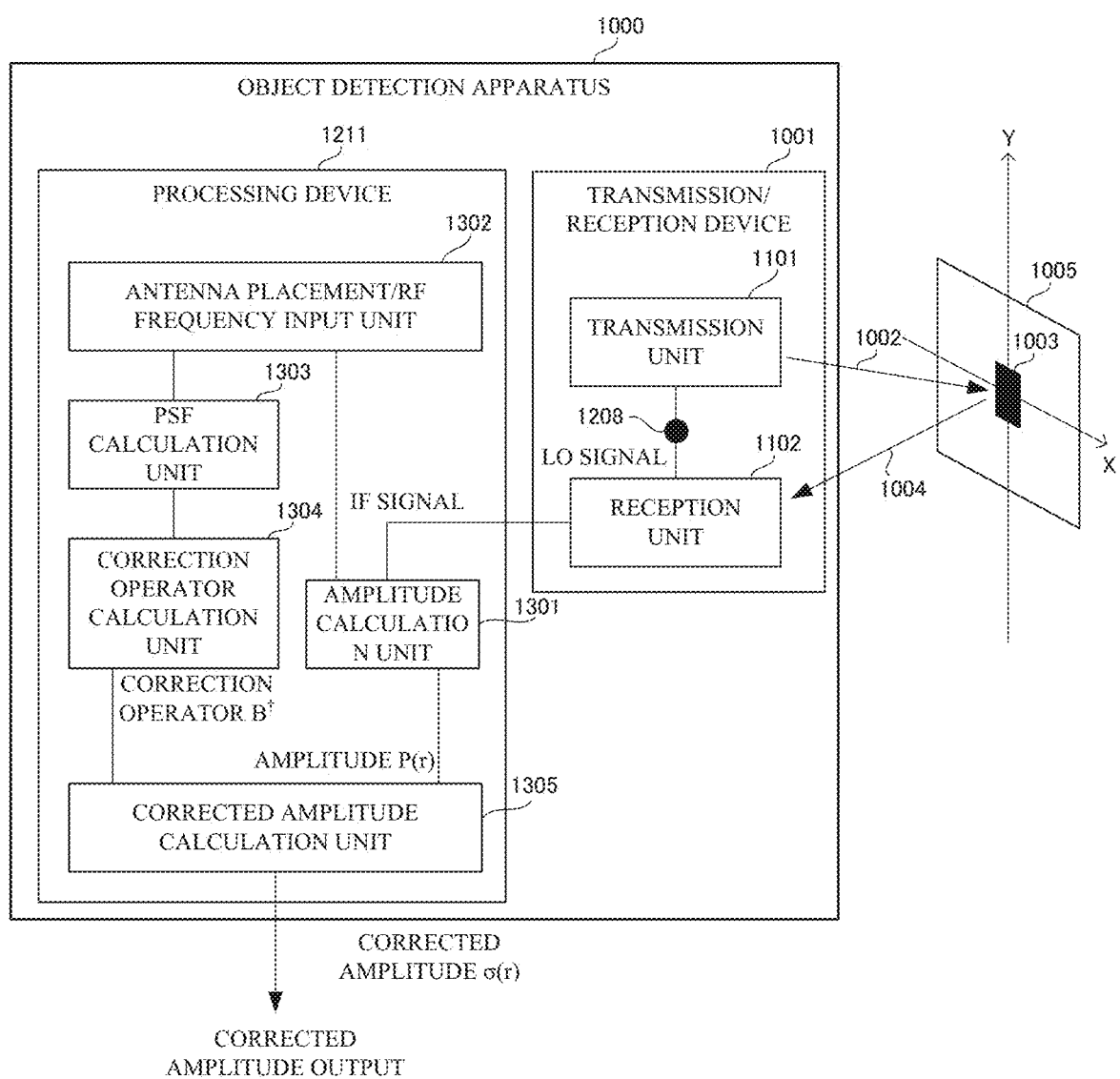
FIG. 4 is a block diagram illustrating the specific configuration of the object detection apparatus according to the example embodiment of the present invention.
Figure 5:
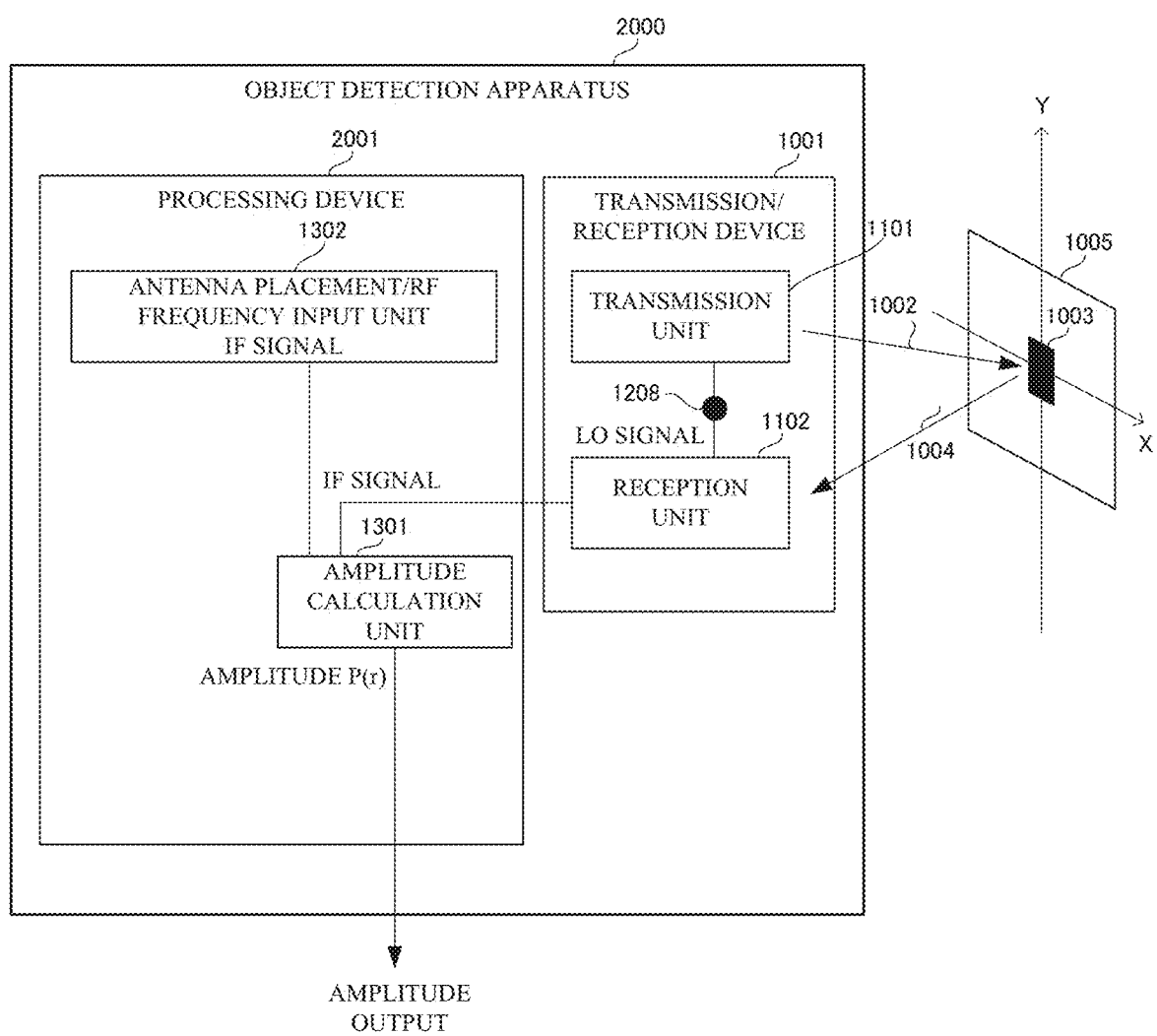
FIG. 5 is a block diagram illustrating the specific configuration of a conventional object detection apparatus.

As illustrated in FIG. 4, in the object detection apparatus 1000 according to the present example embodiment, the processing device 1211 includes an amplitude calculation unit 1301, an antenna placement/RF frequency input unit 1302, a PSF calculation unit 1303, a correction operator calculation unit 1304, and a corrected amplitude calculation unit 1305. Additionally, in the present example embodiment, the processing device 1211 actually includes a computer, and each unit is constructed by the computer. This point will be described later.

The antenna placement/RF frequency input unit 1302 obtains, from the exterior, information such as the placement of the transmission antenna 1202, the placement of the reception antenna 1203, and the frequency of the radio wave 1002 emitted from the transmission antenna 1202 (the RF frequency). The antenna placement/RF frequency input unit 1302 inputs the obtained information to the PSF calculation unit 1303 and the amplitude calculation unit 1301.

The PSF calculation unit 1303 calculates the PSF (point spread function) on the basis of the information input by the antenna placement/RF frequency input unit 1302. The correction operator calculation unit 1304 calculates the correction operator on the basis of the PSF calculated by the PSF calculation unit 1303. The correction operator is used to calculate the true reflection amplitude distribution, as described above.

The amplitude calculation unit 1301 is activated when the transmission unit 1101 emits the radio wave 1002 and the reception unit 1102 receives the radio wave 1004. The amplitude calculation unit 1301 then calculates the reflection amplitude distribution on the basis of the information input by the antenna placement/RF frequency input unit 1302 and the IF signal generated by the reception unit 1102.

Upon the reflection amplitude distribution being calculated by the amplitude calculation unit 1301, the corrected amplitude calculation unit 1305 corrects the reflection amplitude distribution using the correction operator calculated by the correction operator calculation unit 1304. The corrected amplitude calculation unit 1305 then outputs the corrected reflection amplitude distribution as a corrected amplitude.

On the other hand, as illustrated in FIG. 5, a conventional object detection apparatus 2000 includes the transmission/reception device 1001 and a processing device 2001 like the object detection apparatus 1000 illustrated in FIG. 4, but differs from the object detection apparatus 1000 in terms of the configuration of the processing device 2001.

Specifically, as illustrated in FIG. 5, in the conventional object detection apparatus 2000, the processing device 2001 includes only the amplitude calculation unit 1301 and the antenna placement/RF frequency input unit 1302. As such, the conventional object detection apparatus 2000 cannot correct the reflection amplitude distribution, and therefore has a problem in that the range of positions in which the object to be detected can be detected is limited, and a problem in that the desired resolution cannot be achieved and the detection accuracy is therefore poor, as described above.

Apparatus Operations

Figure 6:
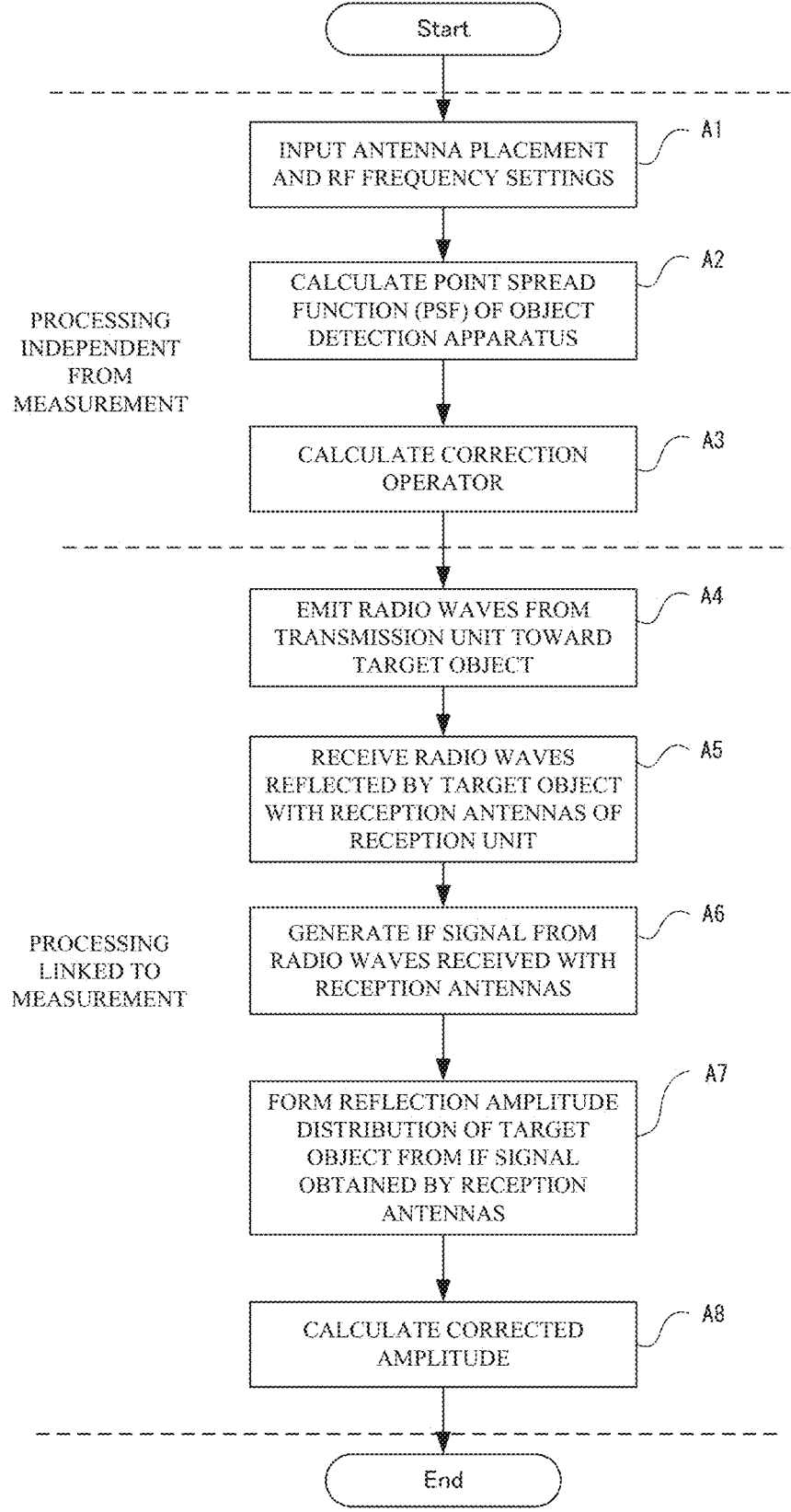
FIG. 6 is a flowchart illustrating operations by the object detection apparatus according to the example embodiment of the present invention.

Operations of the object detection apparatus 1000 according to the example embodiment of the present invention will be described next with reference to FIG. 6. FIG. 6 is a flowchart illustrating operations by the object detection apparatus according to the example embodiment of the present invention. The following descriptions will refer to FIGS. 1 to 4 as appropriate. In the present example embodiment, an object detection method is realized by causing the object detection apparatus 1000 to operate. As such, the following descriptions of the operations of the object detection apparatus 1000 will be given in place of descriptions of the object detection method according to the present first example embodiment.

As illustrated in FIG. 6, the antenna placement/RF frequency input unit 1302 first obtains the information such as the placement of the transmission antenna 1202, the placement of the reception antenna 1203, and the frequency of the radio wave (the transmission signal) transmitted from the transmission antenna 1202 (the RF frequency). The antenna placement/RF frequency input unit 1302 then inputs the obtained information, i.e., the antenna placements and the RF frequency settings, to the PSF calculation unit 1303 and the amplitude calculation unit 1301 (step A1).

Next, the PSF calculation unit 1303 calculates the PSF (point spread function) of the object detection apparatus 1000 on the basis of the information input in step A1 (the placement of the transmission antenna 1202, the placement of the reception antenna 1203, and the RF frequency) (step A2). Step A2 will be described in greater detail later.

Next, the correction operator calculation unit 1304 calculates the correction operator using the point spread function (step A3). As will be described later, the correction operator is an operator for back-calculating the true reflection amplitude distribution of the target object 1003 from the radio wave amplitude distribution of the reflected wave obtained by the amplitude calculation unit 1301.

Next, in the transmission/reception device 1001, the transmission unit 1101 emits the radio wave 1002 serving as the transmission signal toward the target object 1003 (step A4). At the same time as the emission of the radio wave 1002 serving as the transmission signal, the transmission unit 1101 outputs the transmission signal to the reception unit 1102 via the terminal 1208.

Next, in the transmission/reception device 1001, the reception unit 1102 receives, through the reception antenna 1203, the radio wave reflected by the target object 1003 as the reception signal (step A5).

Next, in the transmission/reception device 1001, the reception unit 1102 generates the IF signal by mixing the transmission signal output from the transmission unit 1101 in step A4 with the reception signal received in step A5 (step A6).

Next, the amplitude calculation unit 1301 calculates the amplitude distribution of the radio wave reflected by the target object 1003 (the reflection amplitude distribution) on the basis of the information input in step A1 (the placement of the transmission antenna 1202, the placement of the reception antenna 1203, and the RF frequency) and the IF signal generated in step A6 (step A7).

Next, the corrected amplitude calculation unit 1305 corrects the reflection amplitude distribution of the reflected wave, calculated in step A7, using the correction operator calculated in step A3 (step A8). Through this, the true reflection amplitude distribution of the target object 1003 can be calculated. Additionally, the corrected amplitude calculation unit 1305 outputs the corrected reflection amplitude distribution as a corrected amplitude.

Note that steps A1 to A3 are processes independent from measurement, while steps A4 to A8 are processes linked to measurement (the emission and reception of radio waves). Accordingly, steps A1 to A3 need only be performed once before measurement as long as the placement of the transmission antenna 1202, the placement of the reception antenna 1203, and the RF frequency of the transmission signal are not changed. On the other hand, steps A4 to A8 are executed with each measurement. Steps A4 to A8 need not be executed sequentially, after the execution of steps A1 to A3.

Figure 7:
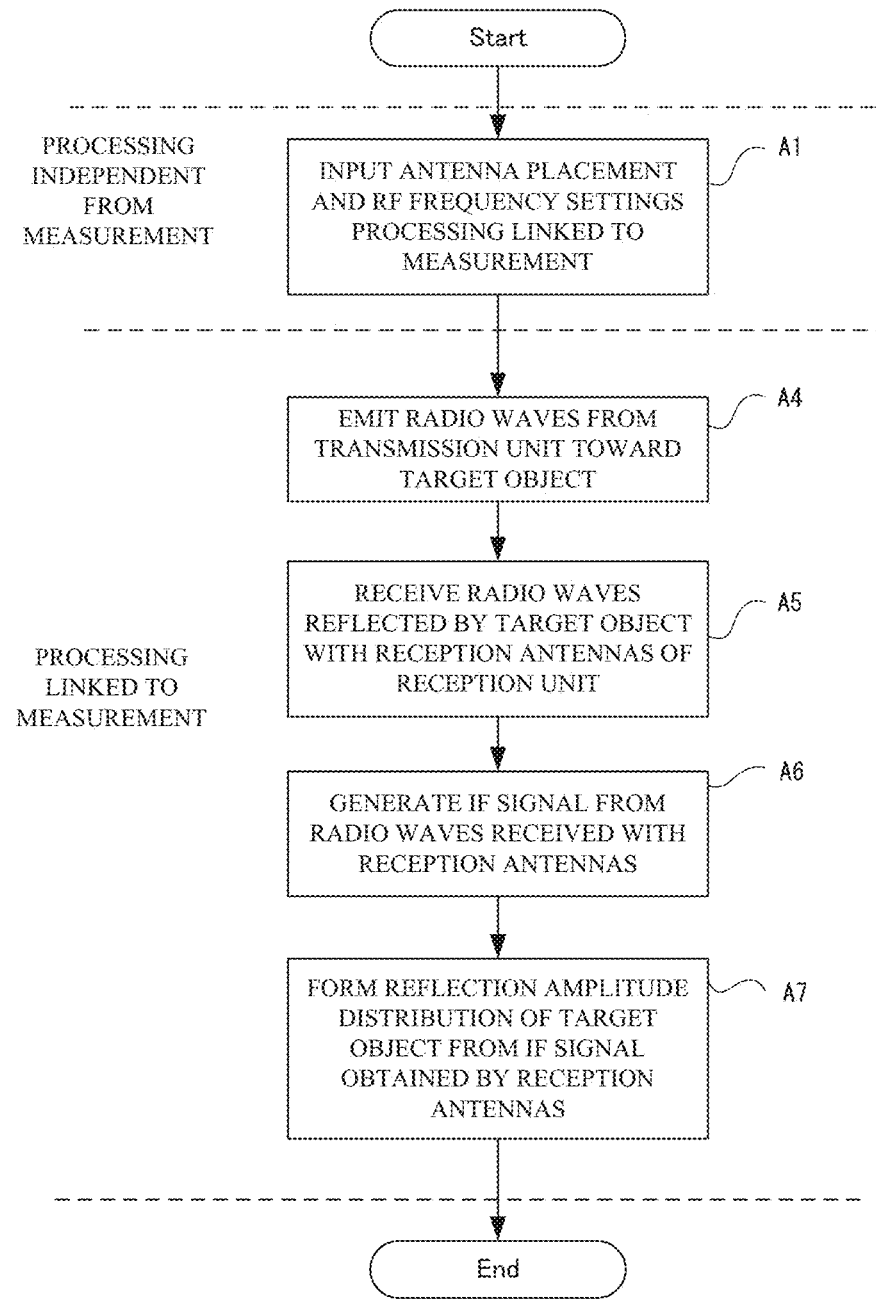
FIG. 7 is a flowchart illustrating operations by the conventional object detection apparatus illustrated in FIG. 5.

Here, for comparison, operations by the conventional object detection apparatus 2000 illustrated in FIG. 5 will be described with reference to FIG. 7. FIG. 7 is a flowchart illustrating operations by the conventional object detection apparatus.

As illustrated in FIG. 7, of steps A1 to A8 illustrated in FIG. 6, the conventional object detection apparatus 2000 executes only steps A1, A4, A5, and A7. In other words, as can be seen from FIG. 7, steps A2, A3, and A6 are not executed by the conventional object detection apparatus, and these steps correspond to characteristic processing in the present example embodiment.

Of the steps A1 through A7 illustrated in FIG. 6, steps A2, A3, A7, and A8, which are performed by the processing device 1211, will be described in detail below.

Step A2

Operations by the PSF calculation unit 1303 in step A2 will be described. The PSF calculation unit 1303 calculates a PSF($r,r_o$) of the object detection apparatus 1000 on the basis of the information output from the antenna placement/RF frequency input unit 1302, i.e., the placement of the transmission antenna 1202, the placement of the reception antenna 1203, and the information of the RF frequency of the transmission signal transmitted from the transmission antenna 1202.

The PSF($r,r_o$) is given by a radio wave amplitude distribution $P(r)$ of the reflected wave from the target object 1003 when the target object 1003 is present only at one point at a position $r_o$. $r_o$ is the position where the target object 1003 is present. The PSF($r,r_o$) can be calculated in advance by determining the placement of the transmission antenna 1202, the placement of the reception antenna 1203, an RF frequency f, and a range of positions to be scanned (called a "scanning position" hereinafter) r. Note that "scanning position r" means a position where the radio wave reflected by the target object 1003 is received (the position of the reception antenna).

If the reflection amplitude distribution at the position $r_o$ of the target object 1003 is given as $\sigma(r_o)$, the relationship between a reflection amplitude distribution $P(r)$ of the reflected wave from the target object 1003 obtained through measurement and a true reflection amplitude distribution $\sigma(r_o)$ of the target object 1003 is given by the following Expression 1.

$$P(r) = B\sigma(r_o) \qquad \text{Expression 1}$$

In the above Expression 1, a matrix B is a PSF matrix. The PSF matrix is a matrix obtained by setting the scanning position r to be constant in each row, setting the position $r_o$ of the target object 1003 to be constant in each column, and furthermore arranging PSF($r,r_o$) as elements.

Note that complex values may be set as the reflection amplitude distribution $P(r)$ of the reflected wave from the target object 1003 obtained through measurement, the PSF matrix B, and the true reflection amplitude distribution $\sigma(r_o)$ of the target object 1003.

Step A3

Operations by the correction operator calculation unit 1304 in step A3 will be described next. The correction operator calculation unit 1304 calculates a correction operator $B^\dagger$ for back-calculating the true reflection amplitude distribution $\sigma(r_o)$ of the target object 1003 from the reflection amplitude distribution $P(r)$ of the reflected wave obtained by the amplitude calculation unit 1301, on the basis of the relationship in the above Expression 1.

Specifically, the correction operator calculation unit 1304 follows the sequence described hereinafter to generate a regularized pseudoinverse matrix of B, rather than an inverse matrix of the PSF matrix B, as the correction operator $B^\dagger$ in order to achieve numerical stability. First, the correction operator calculation unit 1304 performs singular value decomposition of the PSF matrix B using the following Expression 2.

$$B = U\Sigma V^H \qquad \text{Expression 2}$$

In the above Expression 2, U and V are unitary matrices. $\Sigma$ is a diagonal matrix having singular values as components. The matrix $\Sigma$ with all elements below a regularization parameter $\gamma$ set to zero and the nonzero elements set to their reciprocals is taken as $\Sigma^\dagger$. In this case, the correction operator $B^\dagger$ is calculated by the following Expression 3.

$$B^\dagger = V\Sigma^\dagger U^H \quad \text{Expression 3}$$

Step A7

Operations by the amplitude calculation unit 1301 in step A7 will be described next. The beamformer method can be given as one example of a method for calculating the reflection amplitude distribution of the reflected wave from the target object 1003. A processing sequence using the beamformer method will be described below.

Assume that the IF signal obtained through an nth antenna of the reception antenna 1203, when the radio wave 1002 of the frequency f is transmitted from an mth antenna of the transmission antenna 1202, is denoted as s(m,n,f). In the following, u=(m,n,f) is set, and s(m,n,f) is denoted as s(u). The reflection amplitude distribution of the target object 1003 at position r is set to $\sigma(r)$. Assuming that the IF signal s(u) and the reflection amplitude distribution $\sigma(r_o)$ at the position $r_o$ of the target object 1003 are column vectors, the two can be related by a direction matrix A as follows, as indicated by Expression 4 below.

$$s(u) = A\sigma(r) \quad \text{Expression 4}$$

Additionally, the elements of the direction matrix A are given by a(u,r), indicated by the following Expression 5.

$$a(u,r) = \exp[-j2\pi f/c \cdot (R_{TX}(m,r) + R_{RX}(n,r))] \quad \text{Expression 5}$$

Here, $R_{TX}(m,r)$ is the distance from the mth antenna of the transmission antenna 1202 to the position r. $R_{RX}(n,r)$ is the distance from the nth antenna of the reception antenna 1203 to the position r. The direction matrix A is configured by placing the elements a(u,r) with u=(m,n,f) constant in each row and the position r constant in each column. The direction matrix A can be calculated in advance by determining the placement of the transmission antenna 1202, the placement of the reception antenna 1203, the transmission frequency f, and the range of positions r to be scanned.

In the beamformer method, the reflection amplitude distribution P(r) of the reflected wave from the target object 1003 is calculated from the IF signal s(u) obtained through measurement and the direction matrix A calculated in advance, through the following Expression 6. In the following Expression 6, the superscript H of the matrix A represents a complex conjugate.

$$P(r) = A^H s(u) \quad \text{Expression 6}$$

In the present example embodiment, the reflection amplitude distribution P(r) of the reflected wave from the target object 1003 may be calculated on the basis of the beamformer method as described above, but the calculation may be performed on the basis of another method.

Step A8

Operations by the corrected amplitude calculation unit 1305 in step A8 will be described next. The corrected amplitude calculation unit 1305 corrects the reflection amplitude distribution P(r) of the reflected wave, calculated by the amplitude calculation unit 1301, on the basis of the correction operator $B^\dagger$ calculated by the correction operator calculation unit 1304. Through this, the true reflection amplitude distribution $\sigma(r_o)$ of the target object 1003 can be calculated. Specifically, the corrected amplitude calculation unit 1305 calculates the true reflection amplitude distribution $\sigma(r_o)$ of the target object 1003 on the basis of the following Expression 7.

$$\sigma(r_o) = B^\dagger P(r) \quad \text{Expression 7}$$

Additionally, the corrected amplitude calculation unit 1305 outputs the calculated true reflection amplitude distribution $\sigma(r_o)$ as a corrected amplitude. Furthermore, the corrected amplitude calculation unit 1305 can also output the corrected amplitude calculated in step A8 as an image expressing the reflection amplitude distribution of the reflected wave from the target object 1003.

Figure 8:
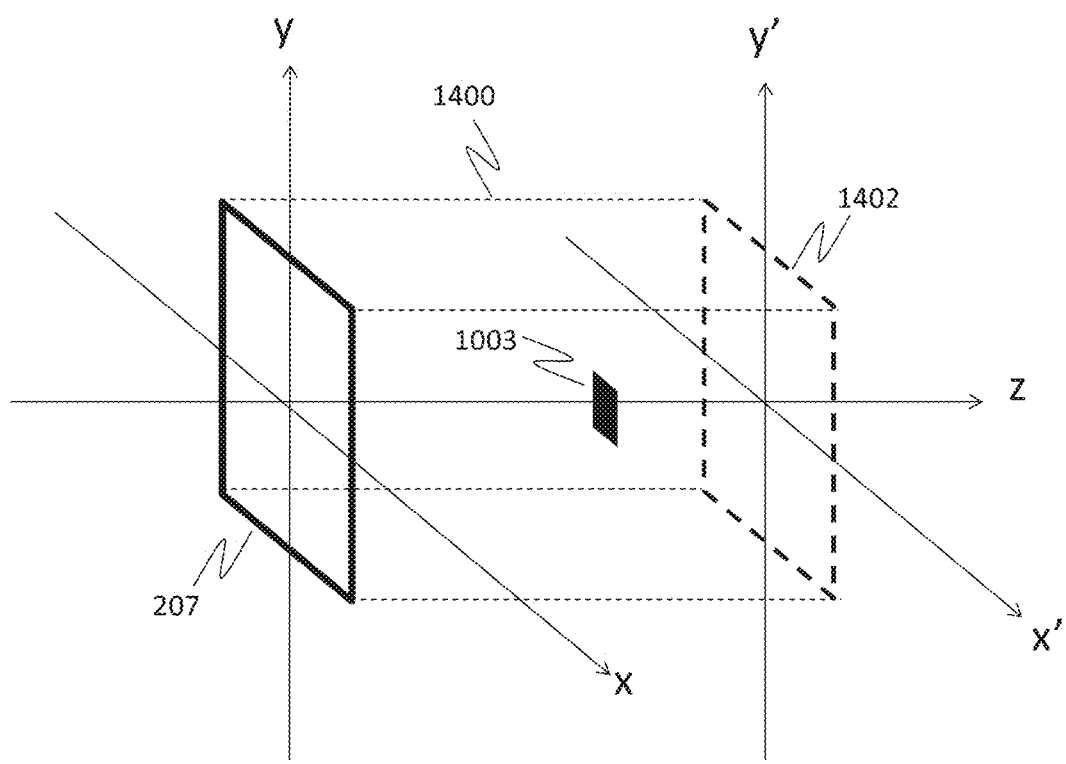
FIG. 8 is a diagram illustrating a positional relationship between an aperture plane of the conventional object detection apparatus illustrated in FIG. 5 and a space in which a target object can be detected.
Figure 9:
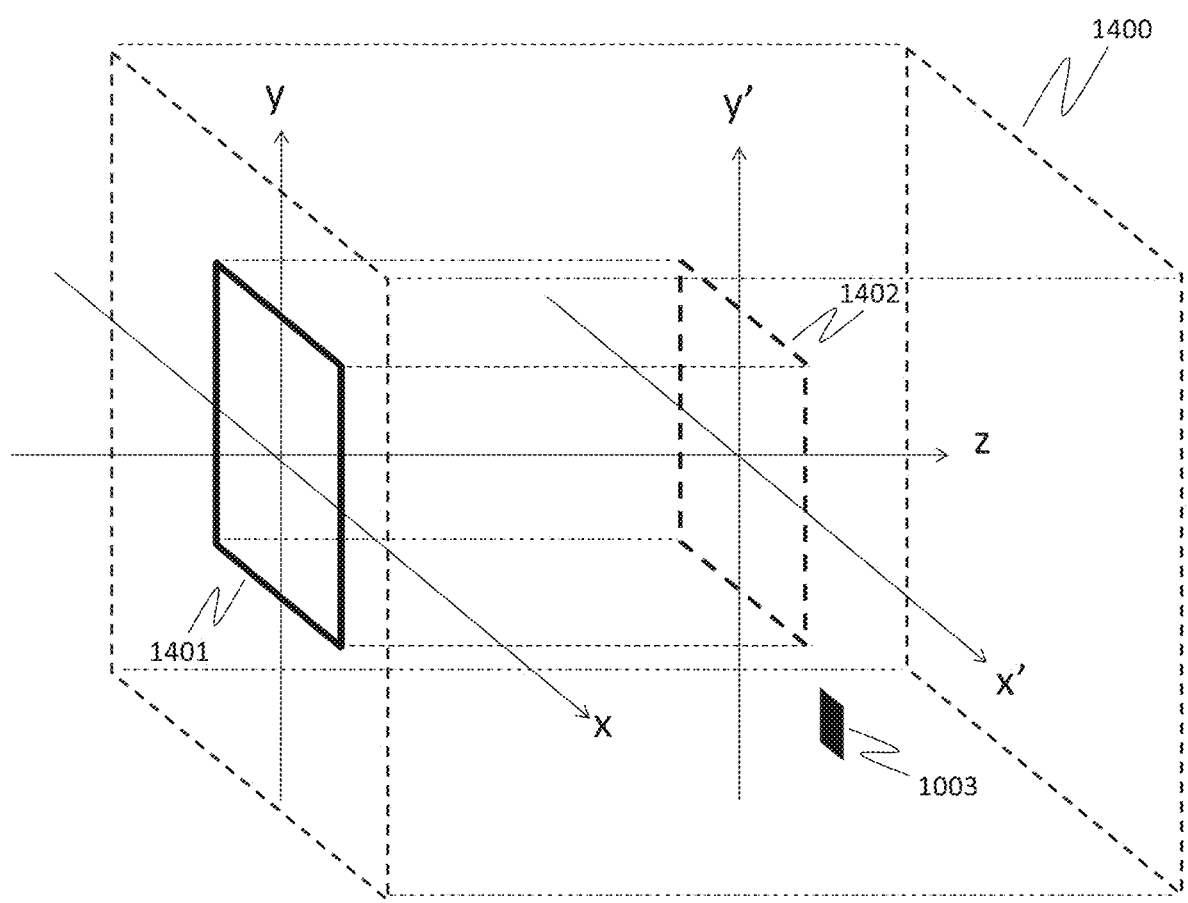
FIG. 9 is a diagram illustrating a positional relationship between an aperture plane of the object detection apparatus according to the example embodiment of the present invention and a space in which a target object can be detected.

Here, the aperture plane of the object detection apparatus according to the present example embodiment and the aperture plane of the conventional object detection apparatus will be compared with reference to FIGS. 8 and 9. FIG. 8 is a diagram illustrating a positional relationship between the aperture plane of the conventional object detection apparatus illustrated in FIG. 5 and a space in which a target object can be detected. FIG. 9 is a diagram illustrating a positional relationship between the aperture plane of the object detection apparatus according to the example embodiment of the present invention and a space in which a target object can be detected.

FIG. 8 illustrates a positional relationship between the aperture plane 207 of the conventional object detection apparatus illustrated in FIG. 5, a region directly facing the aperture plane 207 (called a "directly-facing region" hereinafter) 1402, the target object 1003, and a space in which the target object 1003 can be detected (called a "detection space" hereinafter) 1400. As illustrated in FIG. 8, in the conventional object detection apparatus, the detection space 1400 in which the target object 1003 can be detected is limited to a space surrounded by the aperture plane 207 and the directly-facing region 1402, as described in the section on the problem to be solved by the invention. Specifically, in the example in FIG. 8, the detection space 1400 is constructed as a parallelepiped taking the aperture plane 207 and the directly-facing region 1402 as two opposing faces.

FIG. 9 illustrates a positional relationship between an aperture plane 1401 of the object detection apparatus 1000 according to the present example embodiment, the directly-facing region 1402 directly facing the aperture plane 1401, the target object 1003, and the space in which the target object 1003 can be detected (the detection space) 1400. The aperture plane 1401 is constructed by the transmission antenna 1202 and the reception antenna 1203 illustrated in FIG. 2 or FIG. 3.

As illustrated in FIG. 9, in the present example embodiment, the detection space 1400 of the target object 1003 is a space larger than a parallelepiped taking the aperture plane 1401 and the directly-facing region 1402 as two opposing faces, unlike the example in FIG. 8. In the example in FIG. 9, the detection space 1400 is a space which includes the outer space of the parallelepiped taking the aperture plane 1401 and the directly-facing region 1402 as the two opposing faces. In other words, according to the object detection apparatus 1000 in the present example embodiment, the target object 1003 can also be detected at positions beyond the range of the aperture plane 1401. Note that this point will be described in greater detail later.

First Variation

Figure 10:
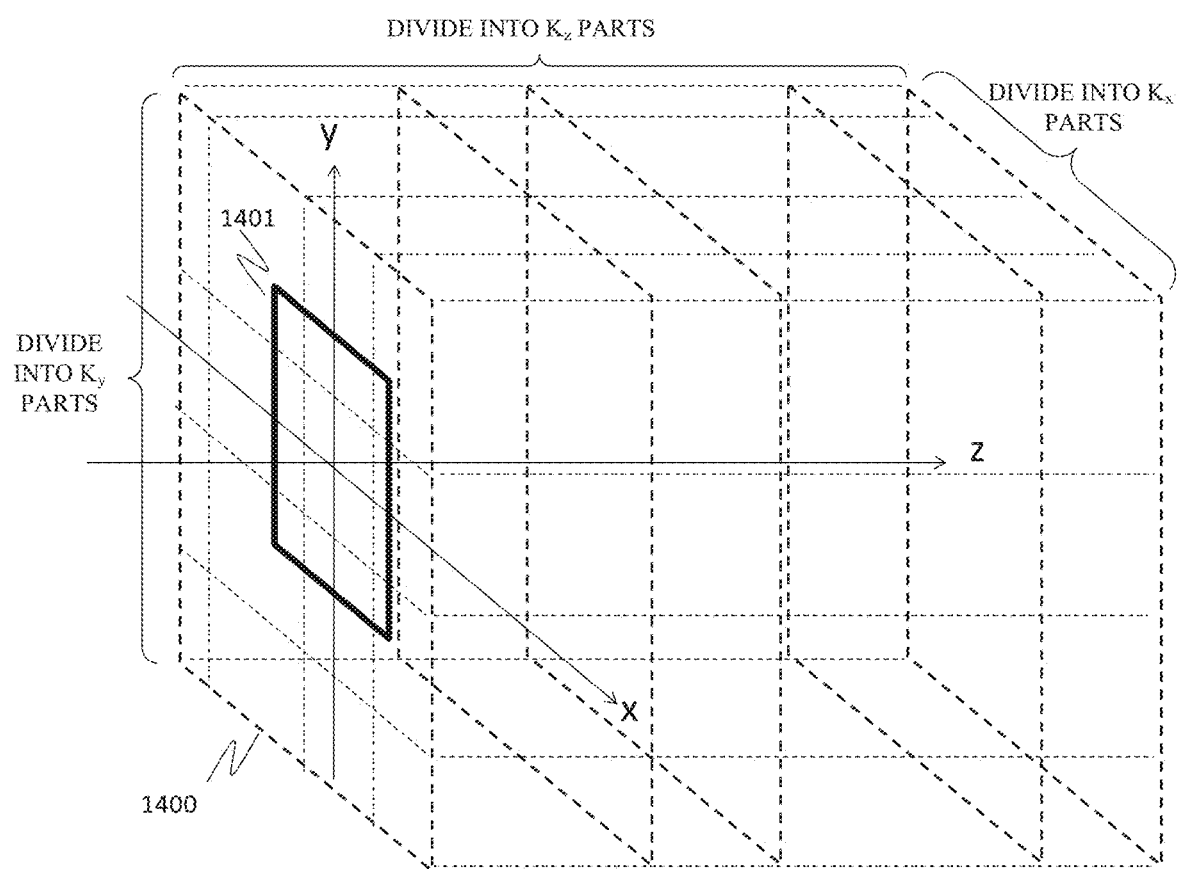
FIG. 10 is a diagram illustrating functions of an object detection apparatus according to a first variation on the example embodiment of the present invention.

A first variation on the object detection apparatus 1000 according to the present example embodiment will be described next with reference to FIG. 10. FIG. 10 is a diagram illustrating functions of the object detection apparatus according to a first variation on the example embodiment of the present invention.

In the present first variation, the corrected amplitude calculation unit 1305 of the processing device 1211 first divides a specific region or a specific space where the target object 1003 is present into a plurality of parts. Then, the corrected amplitude calculation unit 1305 corrects the amplitude distribution for each part obtained by the division (called "partial space" hereinafter), using this partial space as a defining region.

Specifically, FIG. 10 illustrates the aperture plane 1401 of the object detection apparatus 1000, and the detection space 1400 in which the target object 1003 can be detected, according to the present example embodiment. The true reflection amplitude distribution $\sigma(r_o)$ and the reflection amplitude distribution P(r) are calculated in this detection space 1400. Here, the number of target objects 1003 in the detection space 1400 is denoted as N, the amount of calculation required to calculate the corrected amplitude using the above Expression 7 is denoted as $O(N^2)$.

Additionally, like the example in FIG. 9, FIG. 10 illustrates the aperture plane 1401 of the object detection apparatus 1000 and the detection space 1400. In the example in FIG. 10, the detection space 1400 is divided into $K_x$ parts in an x-axis direction, $K_y$ parts in a y-axis direction, and $K_z$ parts in a z-axis direction. In other words, in FIG. 10, the corrected amplitude calculation unit 1305 divides the detection space 1400 into K partial spaces, with $K=K_x K_y K_z$.

In this manner, according to the present first variation, the detection space 1400 is divided into K partial spaces, and thus the amount of calculation of the above Expression 7 per partial space is $O((N/K)^2)$. Additionally, the detection space 1400 contains K partial spaces, and thus the amount of calculation of the above Expression 7 for the detection space 1400 as a whole is $O(N^2/K)$. In other words, if the detection space 1400 is divided into K partial spaces, as in the present first variation, the amount of calculation is reduced by a factor of 1/K compared to a case where the detection space 1400 is not divided. Accordingly, in step A8, it is preferable that the correction process using the above Expression 7 be executed after dividing the detection space 1400 into a plurality of partial spaces.

Second Variation

Figure 11:
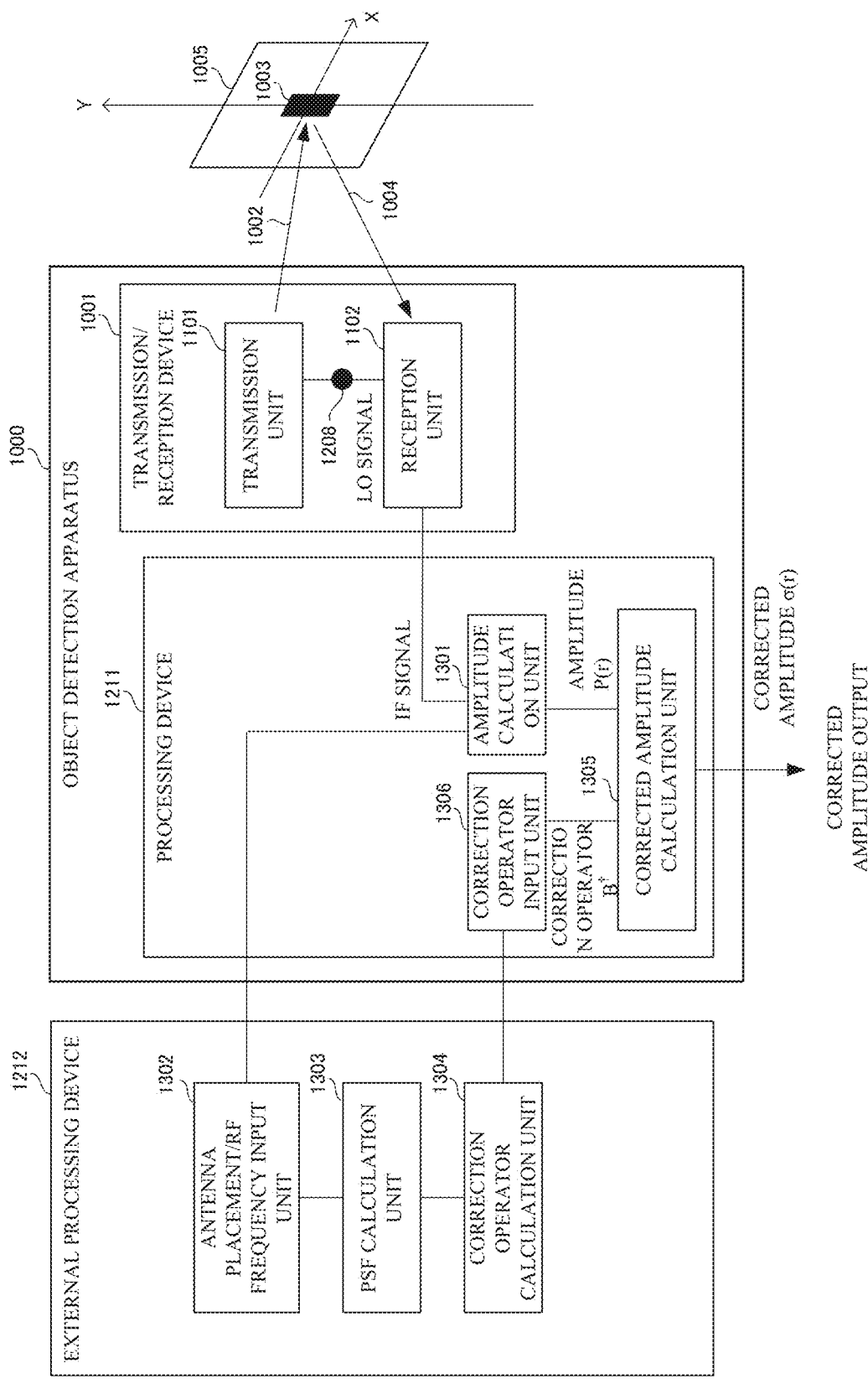
FIG. 11 is a block diagram illustrating the configuration of object detection apparatus according to a second variation on the example embodiment of the present invention.

A second variation on the object detection apparatus 1000 according to the present example embodiment will be described next with reference to FIG. 11. FIG. 11 is a block diagram illustrating the configuration of object detection apparatus according to the second variation on the example embodiment of the present invention.

In the present second variation, the object detection apparatus 1000 is connected to an external separate processing device 1212. Additionally, in the present second variation, unlike the processing device 1211 illustrated in FIG. 4, the processing device 1211 does not include the antenna placement/RF frequency input unit 1302, the PSF calculation unit 1303, and the correction operator calculation unit 1304, and instead includes a correction operator input unit 1306. In the present second variation, the correction operator input unit 1306 is included as an interface for the processing device 1211 with respect to the separate processing device 1212. In the present second variation, like the processing device 1211 illustrated in FIG. 4, the processing device 1211 includes the amplitude calculation unit 1301 and the corrected amplitude calculation unit 1305.

On the other hand, as illustrated in FIG. 11, the external separate processing device 1212 includes the antenna placement/RF frequency input unit 1302, the PSF calculation unit 1303, and the correction operator calculation unit 1304. Accordingly, in the present variation, the information of the placement of the transmission antenna 1202, the placement of the reception antenna 1203, and the frequency (RF frequency) of the radio wave 1002 emitted from the transmission antenna 1202 is obtained by the separate processing device 1212.

The obtained information is then input to the amplitude calculation unit 1301 of the processing device 1211 from the separate processing device 1212. The calculation of the PSF and the calculation of the correction operator based on the PSF are performed in the separate processing device 1212, and the correction operator is input to the correction operator input unit 1306 of the processing device 1211 from the separate processing device 1212. In this case, the correction operator input unit 1306 inputs the correction operator, which has been input by the separate processing device 1212, to the corrected amplitude calculation unit 1305.

According to this configuration, in the present second variation, the processing independent from the measurement (steps A1 to A3) among the steps A1 to A8 illustrated in FIG. 6 are executed by the external separate processing device 1212. On the other hand, the processing related to measurement (steps A4 to A8) is executed by the processing device 1211 of the object detection apparatus 1000.

Additionally, in the present second variation, the processing independent from the measurement (steps A1 to A3) is executed only once by the separate processing device 1212 before the processing related to the measurement (steps A4 to A8) is executed by the processing device 1211. The processing device 1211 then executes the processing related to measurement (steps A4 to A8) with each measurement.

In this manner, according to the present second variation, the processing independent from measurement (steps A1 to A3), which takes a comparatively long processing time, is performed by a processing device separate from the object detection apparatus 1000. As such, according to the present second variation, the processing load on the object detection apparatus 1000 is lightened, and the processing time is shortened.

Effects of the Example Embodiment

Effects of the present example embodiment will be described hereinafter with reference to FIGS. 12 to 16.

Figure 12:
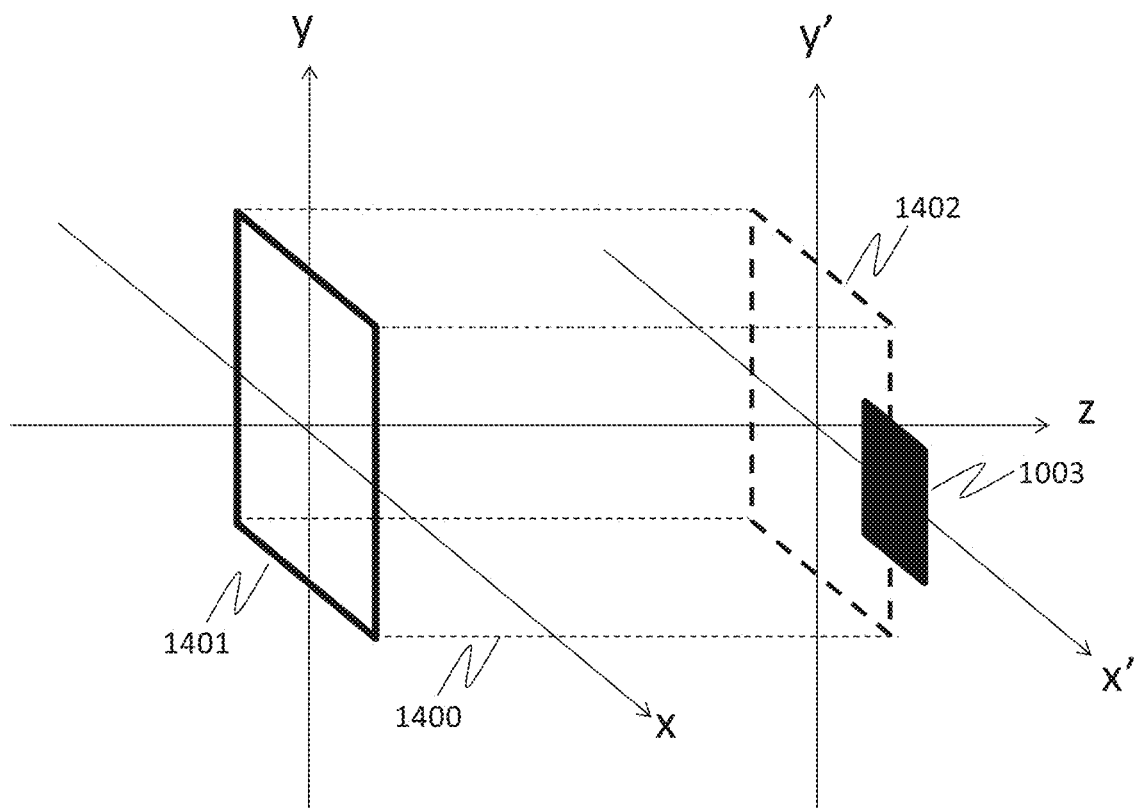
FIG. 12 is a diagram illustrating a positional relationship between the object detection apparatus according to the example embodiment of the present invention and an object to be detected.

FIG. 12 is a diagram illustrating a positional relationship between the object detection apparatus according to the example embodiment of the present invention and an object to be detected. The aperture plane 1401 formed by the transmission antenna 1202 and the reception antenna 1203 of the object detection apparatus 1000, the directly-facing region 1402 directly facing the aperture plane 1401, and the target object 1003 are illustrated in FIG. 12.

In the conventional object detection apparatus, as described in the section on the problem to be solved by the invention, the position at which the target object 1003 can be detected is limited to the detection space 1400 surrounded by the aperture plane 1401 and the directly-facing region 1402 as illustrated in FIG. 12 (see FIG. 8). In the example in FIG. 12 as well, the detection space 1400 is constructed as a parallelepiped taking the aperture plane 207 and the directly-facing region 1402 as two opposing faces.

This problem occurs because, in the conventional object detection apparatus, the reflected waves from a target object 1003 outside the detection space 1400 are weaker than reflected waves from a target object 1003 inside the detection space 1400, which makes it difficult to detect a target object 1003 outside the detection space 1400.

In other words, the reflection amplitude distribution P(r) of the reflected wave from the target object 1003 is obtained as a result of interference of the reflection amplitude distribution σ(r$_o$), weighted by the PSF matrix B, as indicated by Expression 1 above. Accordingly, in the conventional object detection apparatus, even if the true reflection amplitude distribution σ(r$_o$) of the target object 1003 has no amplitude difference between the inside and the outside of the detection space 1400, as a result of the interference of the reflection amplitude distribution σ(r$_o$) weighted by the PSF matrix B, the reflection amplitude becomes stronger inside the detection space 1400 and the amplitude becomes weaker outside, causing the image to disappear.

Figure 13:
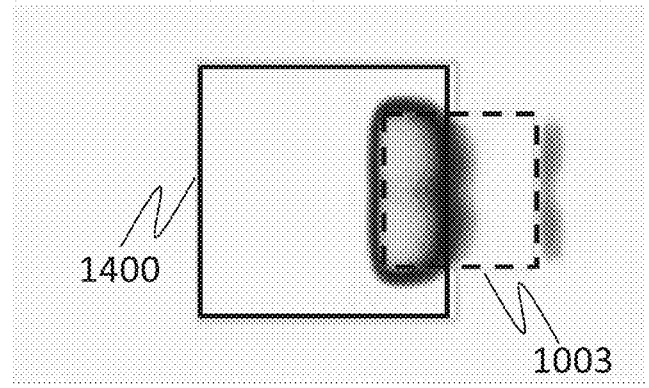
FIG. 13 is a diagram illustrating an example of an image of an object, located bridging the inside and outside of a detection space, that is detected by the conventional object detection apparatus.

A result of a conventional object detection apparatus imaging the reflection amplitude distribution P(r) of the reflected wave from the target object 1003 using the beamformer method, when the target object 1003 bridges the inside and outside of the detection space 1400 (see FIG. 12), will be described with reference to FIG. 13. FIG. 13 is a diagram illustrating an example of an image of an object, located bridging the inside and outside of a detection space, that is detected by the conventional object detection apparatus. As illustrated in FIG. 13, the reflection amplitude distribution P(r) of the reflected wave from the target object 1003 has a strong amplitude inside the detection space 1400. However, outside the detection space 1400, the amplitude weakens and the image disappears.

On the other hand, according to the present example embodiment, an effect is achieved in which the target object 1003 can be detected even when the target object 1003 is located outside the detection space 1400. The reason for this is that in the present example embodiment, it is not the radio wave amplitude distribution P(r), which is weighted by the PSF matrix B and has an amplitude difference between the inside and outside of the detection space 1400, but the true reflection amplitude distribution σ(r$_o$) of the target object 1003, which is unweighted by the PSF matrix B, that is ultimately output.

Figure 14:
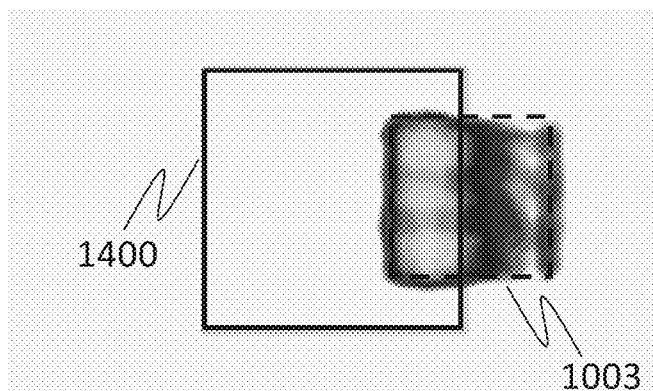
FIG. 14 is a diagram illustrating an example of an image of an object, located bridging the inside and outside of a detection space, that is detected by the object detection apparatus according to the example embodiment of the present invention.

A result of the object detection apparatus 1000 according to the present example embodiment imaging the reflection amplitude distribution P(r) of the reflected wave from the target object 1003 using the beamformer method, when the target object 1003 bridges the inside and outside of the detection space 1400 (see FIG. 12), will be described with reference to FIG. 14. FIG. 14 is a diagram illustrating an example of an image of an object, located bridging the inside and outside of a detection space, that is detected by the object detection apparatus according to the example embodiment of the present invention.

In the example in FIG. 14, the reflection amplitude distribution P(r) of the reflected wave from the target object 1003 is calculated by the amplitude calculation unit 1301, and the calculated reflection amplitude distribution is corrected by the corrected amplitude calculation unit 1305 using the correction operator obtained by the correction operator calculation unit 1304. As a result, the true reflection amplitude distribution σ(r$_o$) of the target object 1003 is obtained as a corrected image. As illustrated in FIG. 14, according to the object detection apparatus 1000 of the present example embodiment, unlike the conventional object detection apparatus, an image of a target object 1003 bridging the inside and the outside of the detection space 1440 is obtained.

In this manner, in the present example embodiment, the target object 1003 which can be detected need not be located inside the detection space 1400, and the location thereof is not limited to a range restricted by the aperture plane 1401. Therefore, according to the present example embodiment, there is no need to increase the size of the aperture plane 1401 in order to expand the range over which the target object 1003 can be detected, which makes it unnecessary to increase the size of the object detection apparatus 1000, and the ease of installation of the object detection apparatus 1000 is also not impaired.

In addition, in the present example embodiment, because there is no need to increase the size of the object detection apparatus 1000, there is no need to increase the number of transmission antennas 1202, the number of reception antennas 1203, and the number of transceivers accordingly. As a result, according to the present example embodiment, the detection range can be expanded without increasing the cost.

Furthermore, the object detection apparatus 1000 according to the present example embodiment has an effect of achieving a higher resolution than the conventional object detection apparatus. In the conventional object detection apparatus, an image distributed wider than the true reflection amplitude distribution σ(r$_o$) of the target object 1003 due to the influence of the PSF, which represents the spread of points, is obtained as the reflection amplitude distribution P(r), as indicated by the above Expression 1. On the other hand, in the object detection apparatus according to the present example embodiment, the final output is the true reflection amplitude distribution σ(r$_o$) of the target object 1003, from which the effect of PSF representing the spread of points is eliminated, and thus the resolution is improved compared to the conventional object detection apparatus.

Figure 15:
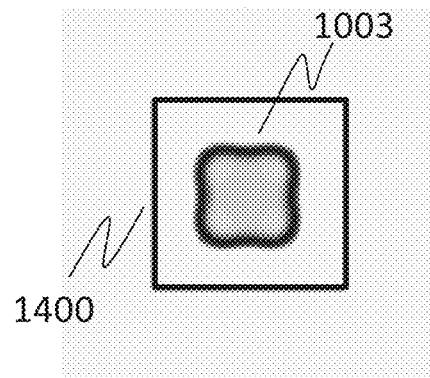
FIG. 15 is a diagram illustrating an example of an image of an object detected by the conventional object detection apparatus.
Figure 16:
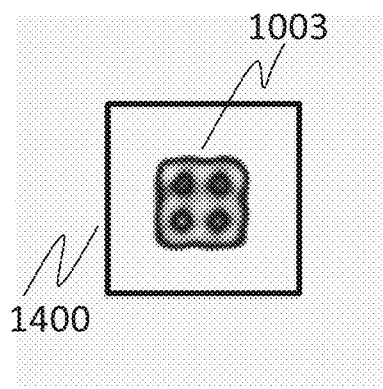
FIG. 16 is a diagram illustrating an example of an image of an object detected by the object detection apparatus according to the example embodiment of the present invention.

Here, the resolution of the object detection apparatus according to the present example embodiment and the resolution of the conventional object detection apparatus will be compared and described, with reference to FIGS. 15 and 16. FIG. 15 is a diagram illustrating an example of an image of an object detected by the conventional object detection apparatus. FIG. 16 is a diagram illustrating an example of an image of an object detected by the object detection apparatus according to the example embodiment of the present invention. In FIGS. 15 and 16, the target object 1003 to be detected is a quadrangle having four holes. Additionally, the images illustrated in FIGS. 15 and 16 indicate results of imaging the radio wave amplitude distribution P(r) of the reflected wave from the target object 1003.

As illustrated in FIG. 15, the conventional object detection apparatus has a low resolution, and thus fails to detect the holes present in the target object 1003. On the other hand, in the present example embodiment, the reflection amplitude distribution P(r) of the reflected wave from the target object 1003 is corrected by the correction operator and calculated as the true reflection amplitude distribution σ(r$_o$). Accordingly, as illustrated in FIG. 16, with the object detection apparatus 1000 according to the example embodiment of the present invention, the resolution is improved compared to the conventional apparatus and as a result, the four holes present in the target object 1003 are detected successfully. In this manner, according to the present example embodiment, a higher resolution is achieved than in the conventional system, and thus an effect in which the accuracy of detecting the target object 1003 is improved can be achieved.

Program

A program according to the present example embodiment may be any program that causes the computer included in the processing device 1211 to execute steps A1 to A3 and A7 to A8 illustrated in FIG. 6. The object detection apparatus 1000 and the object detection method according to the present example embodiment can be implemented by installing the program in the computer and executing the program. In this case, a processor of the computer performs processing by functioning as the amplitude calculation unit 1301, the antenna placement/RF frequency input unit 1302, the PSF calculation unit 1303, the correction operator calculation unit 1304, and the corrected amplitude calculation unit 1305 of the processing device 1211.

The program according to the present example embodiment may be executed by a computer system constructed from a plurality of computers. In this case, for example, the respective computers may function as one of the amplitude calculation unit 1301, the antenna placement/RF frequency input unit 1302, the PSF calculation unit 1303, the correction operator calculation unit 1304, and the corrected amplitude calculation unit 1305 of the processing device 1211.

Figure 17:
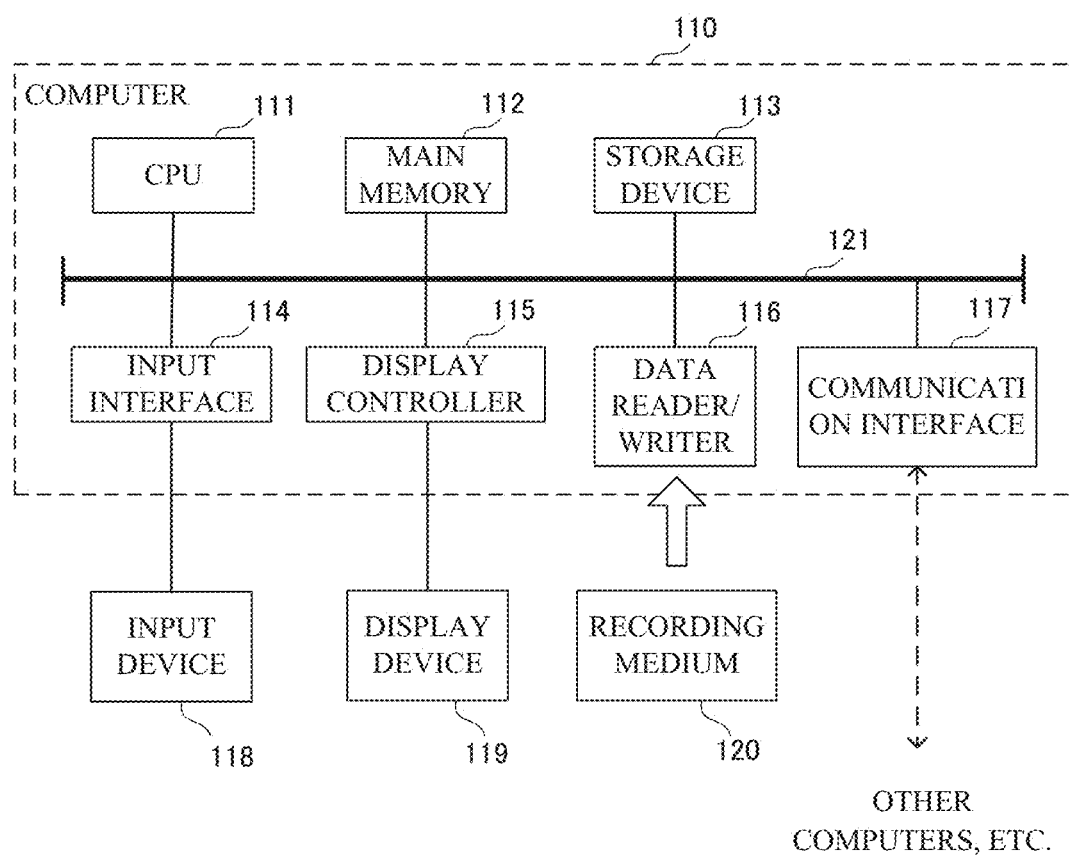
FIG. 17 is a block diagram illustrating an example of a computer implementing a processing device of the object detection apparatus according to the example embodiment of the present invention.
Figure 18:
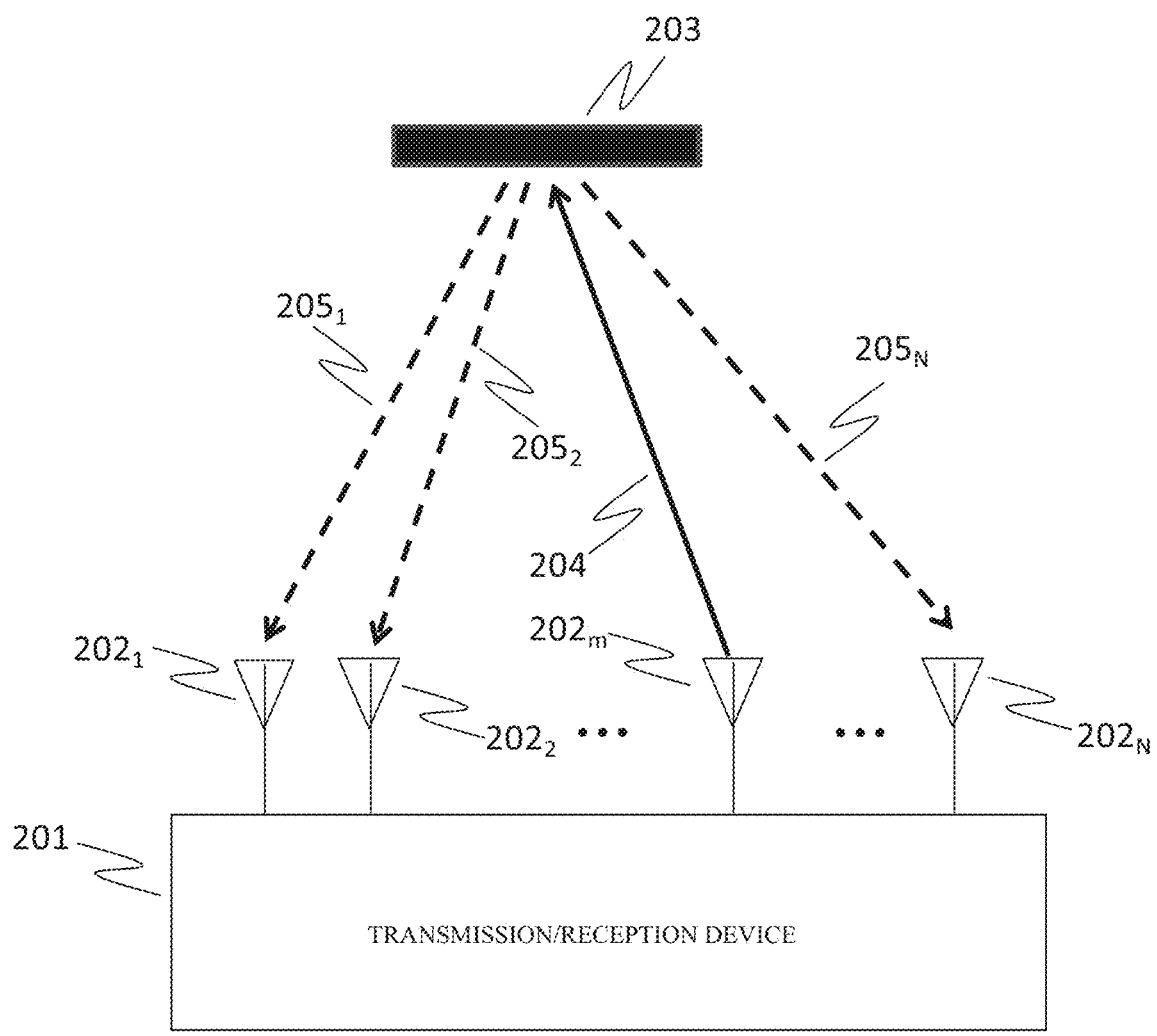
FIG. 18 is a diagram illustrating the overall configuration of a conventional array antenna-type imaging apparatus (object detection apparatus).
Figure 19:
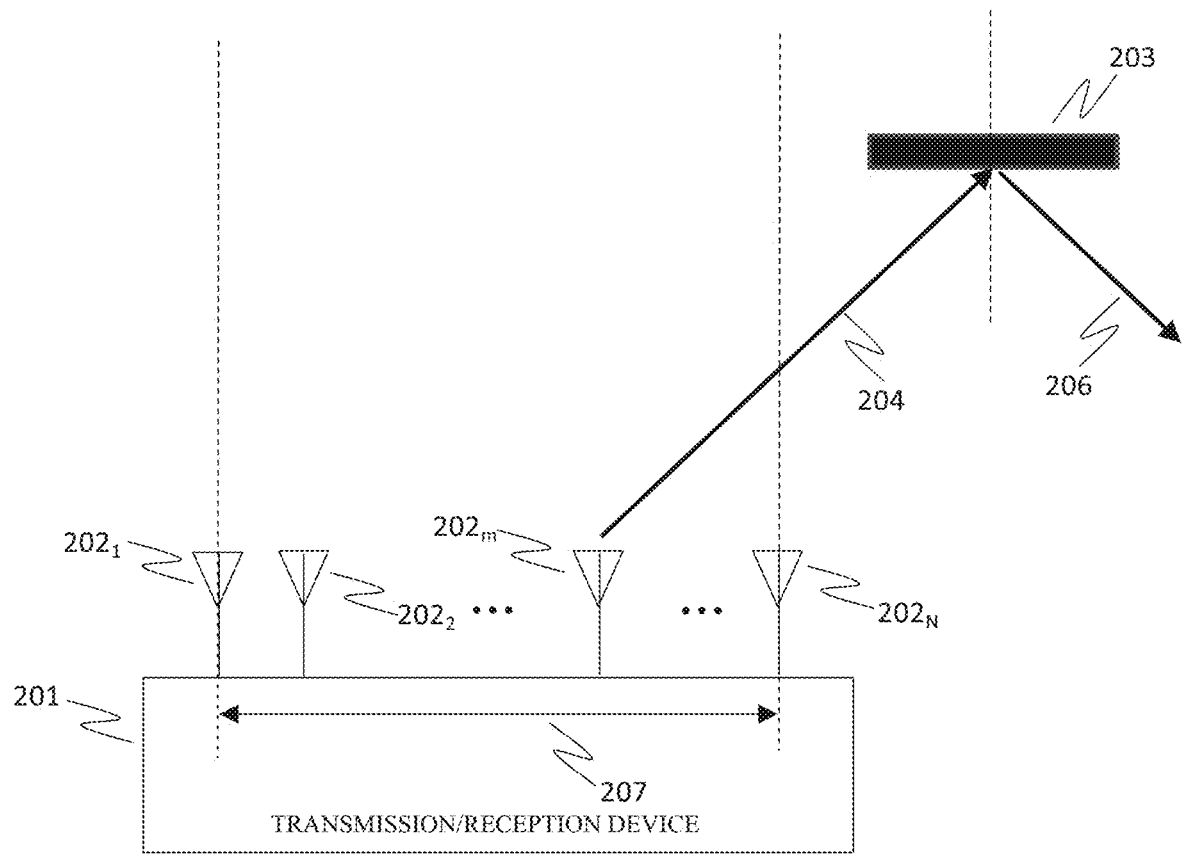
FIG. 19 is a diagram illustrating a problem in the conventional array antenna system.

Here, the computer that implements the processing device 1211 of the object detection apparatus 1000 by executing the program according to the present example embodiment will be described with reference to FIG. 17. FIG. 17 is a block diagram illustrating an example of the computer implementing the processing device of the object detection apparatus according to the example embodiment of the present invention.

As illustrated in FIG. 17, a computer 110 includes a CPU (Central Processing Unit) 111, main memory 112, a storage device 113, an input interface 114, a display controller 115, a data reader/writer 116, and a communication interface 117. These units are connected by a bus 121 so as to be capable of data communication with each other. Note that in addition to, or instead of, the CPU 111, the computer 110 may include a GPU (Graphics Processing Unit) or a FPGA (Field-Programmable Gate Array).

The CPU 111 loads the program (code) according to the present example embodiment, which is stored in the storage device 113, into the main memory 112, and executes the program according to a prescribed sequence, thereby carrying out various types of operations. The main memory 112 is typically a volatile storage device such as DRAM (Dynamic Random Access Memory) or the like. The program according to the present example embodiment is stored in a computer-readable recording medium 120 and provided in such a state. Note that the program according to the present example embodiment may be distributed over the Internet, which is connected via the communication interface 117.

In addition to a hard disk drive, a semiconductor storage device such as Flash memory or the like can be given as a specific example of the storage device 113. The input interface 114 facilitates data transfer between the CPU 111 and an input device 118 such as a keyboard and a mouse. The display controller 115 can be connected to a display device 119, and controls displays made in the display device 119.

The data reader/writer 116 facilitates data transfer between the CPU 111 and the recording medium 120, reads out programs from the recording medium 120, and writes results of processing performed by the computer 110 into the recording medium 120. The communication interface 117 facilitates data exchange between the CPU 111 and other computers.

A generic semiconductor storage device such as CF (Compact Flash (registered trademark)), SD (Secure Digital), or the like, a magnetic recording medium such as a flexible disk or the like, an optical recording medium such as a CD-ROM (Compact Disk Read Only Memory) or the like, and so on can be given as specific examples of the recording medium 120.

Note that the processing device 1211 of the object detection apparatus 1000 according to the present example embodiment can also be implemented using hardware corresponding to the respective units, instead of a computer in which a program is installed. Furthermore, the processing device 1211 of the object detection apparatus 1000 may be partially implemented by a program, with the remaining parts realized by hardware.

All or parts of the above-described example embodiments can be expressed as Supplementary Note 1 to Supplementary Note 15, described hereinafter, but are not intended to be limited to the following descriptions.

Supplementary Note 1

An object detection apparatus for detecting an object using radio waves, the apparatus including:

a transmission unit, including a transmission antenna, configured to emit a radio wave toward the object using the transmission antenna;

a reception unit, including a reception antenna, configured to receive the radio wave reflected by the object as a reception signal and generate an intermediate frequency signal from the reception signal received; and a processing device, wherein the processing device:

calculates an amplitude distribution of the radio wave reflected by the object on the basis of a placement of the transmission antenna, a placement of the reception antenna, a frequency of the radio wave emitted from the transmission antenna, and the intermediate frequency signal, and furthermore, corrects the amplitude distribution calculated, using a correction operator calculated from a point spread function indicating characteristics of the transmission unit and the reception unit.

Supplementary Note 2

The object detection apparatus according to Supplementary Note 1, wherein the processing device calculates the point spread function on the basis of the placement of the transmission antenna, the placement of the reception antenna, and the frequency of the radio wave emitted from the transmission antenna, calculates the correction operator on the basis of the point spread function calculated, and corrects the amplitude distribution using the correction operator calculated.

Supplementary Note 3

The object detection apparatus according to Supplementary Note 2, wherein the processing device calculates a pseudoinverse matrix of a matrix that takes the point spread function as an element, and corrects the amplitude distribution using, as the correction operator, the pseudoinverse matrix calculated.

Supplementary Note 4

The object detection apparatus according to Supplementary Note 1, wherein the processing device accepts an input of the correction operator from outside, and corrects the amplitude distribution using the correction operator for which the input is accepted.

Supplementary Note 5

The object detection apparatus according to any one of Supplementary Notes 1 to 4, wherein the processing device divides a specific region or a specific space in which the object is present into a plurality of parts, and corrects the amplitude distribution for each of the parts obtained from the dividing using the parts as defining regions.

Supplementary Note 6

An object detection method for detecting an object using radio waves, the method including, in an object detection apparatus including a transmission unit, having a transmission antenna, configured to emit a radio wave toward the object using the transmission antenna, and a reception unit, having a reception antenna, configured to receive the radio wave reflected by the object as a reception signal and generate an intermediate frequency signal from the reception signal received:

(a) a step of calculating an amplitude distribution of the radio wave reflected by the object on the basis of a placement of the transmission antenna, a placement of the reception antenna, a frequency of the radio wave emitted from the transmission antenna, and the intermediate frequency signal; and (b) a step of correcting the amplitude distribution calculated, using a correction operator calculated from a point spread function indicating characteristics of the transmission unit and the reception unit.

Supplementary Note 7

The object detection method according to Supplementary Note 6, further including:

in the object detection apparatus, (c) a step of calculating the point spread function on the basis of the placement of the transmission antenna, the placement of the reception antenna, and the frequency of the radio wave emitted from the transmission antenna, and calculating the correction operator on the basis of the point spread function calculated, wherein in the (b) step, the amplitude distribution is corrected using the correction operator calculated.

Supplementary Note 8

The object detection method according to Supplementary Note 7, wherein in the (c) step, a pseudoinverse matrix of a matrix that takes the point spread function as an element is calculated as the correction operator, and in the (b) step, the amplitude distribution is corrected using the pseudoinverse matrix.

Supplementary Note 9

The object detection method according to Supplementary Note 6, wherein in the (b) step, an input of the correction operator from outside is accepted, and the amplitude distribution is corrected using the correction operator for which the input is accepted.

Supplementary Note 10

The object detection method according to any one of Supplementary Notes 6 to 9, wherein in the (b) step, a specific region or a specific space in which the object is present is divided into a plurality of parts, and the amplitude distribution is corrected for each of the parts obtained from the dividing using the parts as defining regions.

Supplementary Note 11

A computer-readable recording medium in which is recorded a program for using a computer to detect an object using radio waves, the program including commands for causing the computer to execute, in an object detection apparatus including a transmission unit, having a transmission antenna, configured to emit a radio wave toward the object using the transmission antenna, and a reception unit, having a reception antenna, configured to receive the radio wave reflected by the object as a reception signal and generate an intermediate frequency signal from the reception signal received:

(a) a step of calculating an amplitude distribution of the radio wave reflected by the object on the basis of a placement of the transmission antenna, a placement of the reception antenna, a frequency of the radio wave emitted from the transmission antenna, and the intermediate frequency signal; and (b) a step of correcting the amplitude distribution calculated, using a correction operator calculated from a point spread function indicating characteristics of the transmission unit and the reception unit.

Supplementary Note 12

The computer-readable recording medium according to Supplementary Note 11, wherein the program further includes commands for causing the computer to execute:

(c) a step of calculating the point spread function on the basis of the placement of the transmission antenna, the placement of the reception antenna, and the frequency of the radio wave emitted from the transmission antenna, and calculating the correction operator on the basis of the point spread function calculated, wherein in the (b) step, the amplitude distribution is corrected using the correction operator calculated.

Supplementary Note 13

The computer-readable recording medium according to Supplementary Note 12, wherein in the (c) step, a pseudoinverse matrix of a matrix that takes the point spread function as an element is calculated as the correction operator, and in the (b) step, the amplitude distribution is corrected using the pseudoinverse matrix.

Supplementary Note 14

The computer-readable recording medium according to Supplementary Note 11, wherein in the (b) step, an input of the correction operator from outside is accepted, and the amplitude distribution is corrected using the correction operator for which the input is accepted.

Supplementary Note 15

The computer-readable recording medium according to any one of Supplementary Notes 11 to 14, wherein in the (b) step, a specific region or a specific space in which the object is present is divided into a plurality of parts, and the amplitude distribution is corrected for each of the parts obtained from the dividing using the parts as defining regions.

The configuration of a preferred embodiment of the present invention has been described thus far. However, the content disclosed in the above-described Patent Document and so on can be incorporated into the present invention by reference. Many changes and variations on the example embodiment are possible on the basis of that basic technical spirit, without departing from the scope of the overall disclosure of the present invention (including the scope of the patent claims). Additionally, various elements disclosed can be combined or selected in a variety of ways without departing from the scope of the patent claims of the present invention. In other words, the present invention includes various modifications and variations that can be carried out by one skilled in the art according to the overall disclosure and technical spirit including the scope of the patent claims.

INDUSTRIAL APPLICABILITY

As described above, according to the present invention, an increase in the size and cost of the apparatus can be suppressed while expanding the range of positions for an object to be detected and improving the resolution. The present invention is useful in imaging apparatuses, remote sensing apparatuses, and the like that detect objects using radio waves.

REFERENCE SIGNS LIST

110 Computer
111 CPU

112 Main memory
113 Storage device
114 Input interface
115 Display controller
116 Data reader/writer
117 Communication interface
118 Input device
119 Display device
120 Recording medium
121 Bus
1000 Object detection apparatus
1001 Transmission/reception device
1002 Radio wave (transmission signal)
1003 Target object (object to be detected)
1004 Radio wave (reception signal)
1005 Target object placement plane
1101 Transmission unit
1102 Reception unit
1201 Oscillator
1202 Transmission antenna
1203 Reception antenna
1204 Mixer
1205 Interface circuit
1206 Variable phase shifter
1208 Terminal
1211 Processing device
1301 Amplitude calculation unit
1302 Antenna placement/RF frequency input unit
1303 PSF (point spread function) calculation unit
1304 Correction operator calculation unit
1305 Corrected amplitude calculation unit
1306 Correction operator input unit
1400 Detection space
1401 Aperture plane
1402 Directly-facing region

What is claimed is:

1. An object detection apparatus for detecting an object using radio waves, the apparatus comprising:
a transmission antenna;
an oscillator that emits a radio wave toward the object using the transmission antenna;
a reception antenna;
a mixer that receives the radio wave reflected by the object as a reception signal and generates an intermediate frequency signal from the reception signal received;
an interface circuit that outputs the generated intermediate frequency signal; and
a computer that,
calculates an amplitude distribution of the radio wave reflected by the object on the basis of a placement of the transmission antenna, a placement of the reception antenna, a frequency of the radio wave emitted from the transmission antenna, and the intermediate frequency signal;
calculates a point spread function on the basis of the placement of the transmission antenna, the placement of the reception antenna, and the frequency of the radio wave emitted from the transmission antenna;
calculates a pseudoinverse matrix of a matrix that takes the point spread function as an element; and
corrects the amplitude distribution using, as the correction operator, the pseudoinverse matrix.

2. The object detection apparatus according to claim 1, wherein the computer accepts an input of the correction operator from outside, and corrects the amplitude distribution using the correction operator for which the input is accepted.

3. The object detection apparatus according to claim 1, wherein the computer divides a specific region or a specific space in which the object is present into a plurality of parts, and corrects the amplitude distribution for each of the parts obtained from the dividing using the parts as defining regions.

4. An object detection method for detecting an object using radio waves, the method comprising,
in an object detection apparatus including a transmission antenna, an oscillator that emits a radio wave toward the object using the transmission antenna, a reception antenna, a mixer receives the radio wave reflected by the object as a reception signal and generates an intermediate frequency signal from the reception signal received, and an interface circuit that outputs the generated intermediate frequency signal:
calculating an amplitude distribution of the radio wave reflected by the object on the basis of a placement of the transmission antenna, a placement of the reception antenna, a frequency of the radio wave emitted from the transmission antenna, and the intermediate frequency signal;
calculating a point spread function on the basis of the placement of the transmission antenna, the placement of the reception antenna, and the frequency of the radio wave emitted from the transmission antenna;
calculating a pseudoinverse matrix of a matrix that takes the point spread function as an element; and
correcting the amplitude distribution using, as the correction operator, the pseudoinverse matrix.

5. The object detection method according to claim 4, wherein in the correcting, an input of the correction operator from outside is accepted, and the amplitude distribution is corrected using the correction operator for which the input is accepted.

6. The object detection method according to claim 4, wherein in the correcting, a specific region or a specific space in which the object is present is divided into a plurality of parts, and the amplitude distribution is corrected for each of the parts obtained from the dividing using the parts as defining regions.

7. A non-transitory computer-readable recording medium storing a program executable by a computer to detect an object using radio waves, the program including commands for causing the computer to execute,
in an object detection apparatus including a transmission antenna, an oscillator that emits a radio wave toward the object using the transmission antenna, a reception antenna, a mixer receives the radio wave reflected by the object as a reception signal and generates an intermediate frequency signal from the reception signal received, and an interface circuit that outputs the generated intermediate frequency signal:
calculating an amplitude distribution of the radio wave reflected by the object on the basis of a placement of the transmission antenna, a placement of the reception antenna, a frequency of the radio wave emitted from the transmission antenna, and the intermediate frequency signal;
calculating a point spread function on the basis of the placement of the transmission antenna, the placement of the reception antenna, and the frequency of the radio wave emitted from the transmission antenna;

calculating a pseudoinverse matrix of a matrix that takes the point spread function as an element; and correcting the amplitude distribution using, as the correction operator, the pseudoinverse matrix.

8. The non-transitory computer-readable recording medium according to claim 7, wherein in the correcting, an input of the correction operator from outside is accepted, and the amplitude distribution is corrected using the correction operator for which the input is accepted.

9. The non-transitory computer-readable recording medium according to claim 7, wherein in the correcting, a specific region or a specific space in which the object is present is divided into a plurality of parts, and the amplitude distribution is corrected for each of the parts obtained from the dividing using the parts as defining regions.

\* \* \* \* \*